(12) United States Patent
Zang et al.

(10) Patent No.: US 12,119,469 B2
(45) Date of Patent: Oct. 15, 2024

(54) HEAT MANAGEMENT ASSEMBLY AND HEAT MANAGEMENT SYSTEM

(71) Applicant: ZHEJING SANHUA INTELLIGENT CONTROLS CO., LTD, Zhejiang (CN)

(72) Inventors: Chenqiang Zang, Zhejiang (CN); Zhiguo Hua, Zhejiang (CN)

(73) Assignee: ZHEJIANG SANHUA INTELLIGENT CONTROLS CO., LTD., Zhejiang (CN)

( * ) Notice: Subject to any disclaimer, the term of this patent is extended or adjusted under 35 U.S.C. 154(b) by 464 days.

(21) Appl. No.: 17/432,604

(22) PCT Filed: Mar. 19, 2020

(86) PCT No.: PCT/CN2020/080137
§ 371 (c)(1),
(2) Date: Aug. 20, 2021

(87) PCT Pub. No.: WO2020/192541
PCT Pub. Date: Oct. 1, 2020

(65) Prior Publication Data
US 2022/0069379 A1    Mar. 3, 2022

(30) Foreign Application Priority Data

Mar. 27, 2019 (CN) .......................... 201920396182.7

(51) Int. Cl.
*H01M 10/6552* (2014.01)
*B60H 1/00* (2006.01)
(Continued)

(52) U.S. Cl.
CPC .... *H01M 10/6552* (2015.04); *B60H 1/00278* (2013.01); *B60H 1/3229* (2013.01);
(Continued)

(58) Field of Classification Search
CPC ............. B60H 1/00278; B60H 1/3229; H01M 10/6552; H01M 10/425; H01M 10/6568;
(Continued)

(56) References Cited

U.S. PATENT DOCUMENTS

2010/0243200 A1  9/2010 Baker, Jr. et al.
2012/0061048 A1  3/2012 Ohi et al.
(Continued)

FOREIGN PATENT DOCUMENTS

CN    103712383 A    4/2014
CN    205939839 U    2/2017
(Continued)

OTHER PUBLICATIONS

International Search Report dated Jun. 18, 2018 for PCT application No. PCT/CN2020/080137.
(Continued)

*Primary Examiner* — Marc E Norman
(74) *Attorney, Agent, or Firm* — Ohlandt, Greeley and Perle, L.L.P.

(57) ABSTRACT

A heat management assembly includes a valve component and a heat exchange core body. The heat exchange core body and the valve component are fixedly connected by welding. The valve component further includes a sensor. The sensor is electrically connected to a circuit board. The sensor at least partially extends into a third flow channel. The sensor can measure the temperature and/or pressure of a working medium in the third flow channel. The heat exchange core body at least includes a positioning portion. A valve at least includes a matching portion. The positioning portion and the matching portion are provided to correspondingly match each other. The sensor, the valve component, and the heat exchange core body are integrally assembled to facilitate relative reduction of connections of pipelines and sensor (Continued)

lines, thereby facilitating structure simplification and facilitating mounting.

10 Claims, 13 Drawing Sheets

(51) Int. Cl.
  *B60H 1/32* (2006.01)
  *F28D 9/00* (2006.01)
  *F28F 9/02* (2006.01)
  *F28F 27/02* (2006.01)
  *H01M 10/42* (2006.01)
  *H01M 10/6568* (2014.01)
  *H01M 10/663* (2014.01)
  *F28D 21/00* (2006.01)
  *H01M 10/625* (2014.01)

(52) U.S. Cl.
  CPC ............ *F28D 9/005* (2013.01); *F28F 9/0253* (2013.01); *F28F 27/02* (2013.01); *H01M 10/425* (2013.01); *H01M 10/6568* (2015.04); *H01M 10/663* (2015.04); *B60H 2001/00307* (2013.01); *F28D 2021/0085* (2013.01); *F28F 2280/04* (2013.01); *H01M 2010/4271* (2013.01); *H01M 10/625* (2015.04)

(58) Field of Classification Search
  CPC .................. H01M 10/663; F28D 9/005; F28D 2021/0085; F28F 9/0253; F28F 27/02; F28F 2280/04
  See application file for complete search history.

(56) References Cited

U.S. PATENT DOCUMENTS

| | | |
|---|---|---|
| 2015/0000569 A1 | 1/2015 | Denoual et al. |
| 2015/0369115 A1 | 12/2015 | Kim et al. |
| 2016/0282025 A1 | 9/2016 | Moreau et al. |
| 2016/0363399 A1* | 12/2016 | Kim ........................ F28D 9/005 |
| 2018/0080693 A1 | 3/2018 | Wang et al. |
| 2020/0019198 A1* | 1/2020 | Qiu ..................... G05D 23/1333 |
| 2020/0031198 A1* | 1/2020 | Chen ................. B60H 1/00278 |
| 2020/0016326 A1 | 5/2020 | Zhang et al. |
| 2020/0163263 A1* | 5/2020 | Zhang ................... F16K 27/029 |
| 2020/0284483 A1* | 9/2020 | Ye ........................... F25B 41/20 |

FOREIGN PATENT DOCUMENTS

| | | |
|---|---|---|
| CN | 108253159 A | 7/2018 |
| CN | 108869830 A | 11/2018 |
| JP | H01-028762 | 2/1989 |
| JP | 08-082457 A | 3/1996 |
| JP | 2013142452 A | 7/2013 |
| JP | 2015212604 A | 11/2015 |
| JP | 2016534935 A | 11/2016 |
| JP | 6406897 B2 | 10/2018 |
| WO | 2017012495 A1 | 1/2017 |
| WO | 2018086553 A1 | 5/2018 |
| WO | 2018205746 A1 | 11/2018 |

OTHER PUBLICATIONS

European Search Report dated Nov. 2, 2022 for European Appl. No. 20779686.3.
Japanese Office Action dated Sep. 6, 2022 for Japanese Appl. No. 2021-552219.

* cited by examiner

HEAT MANAGEMENT ASSEMBLY AND HEAT MANAGEMENT SYSTEM

This application is a National Phase entry of PCT Application No. PCT/CN2020/080137, filed on Mar. 19, 2020, which claims priority of Chinese Patent Application No. 201920396182.7, titled "HEAT MANAGEMENT ASSEMBLY AND HEAT MANAGEMENT SYSTEM", filed with the China National Intellectual Property Administration on Mar. 27, 2019, which are incorporated herein by reference in their entireties.

TECHNICAL FIELD

The present application relates to the technical field of vehicles, and in particular to a heat management assembly and heat management system.

BACKGROUND

In a battery heat management system of an electric vehicle or hybrid vehicle, a battery of the electric vehicle or the hybrid vehicle generates heat in the operation. In order to ensure a normal operation of the battery, the battery needs to be cooled, which is commonly cooled by coolant liquid. A normal battery cooling system includes a heat exchanger and an expansion valve. A refrigerant enters the heat exchanger through a throttling effect of the expansion valve. The heat exchanger may generally be a dual-channel heat exchanger with two kinds of fluids flowing inside, which are respectively a refrigerant and a cooling liquid isolated from each other in the heat exchanger, and exchange heat in the heat exchanger, so that the cooling liquid is cooled, and the battery is cooled through a circulation of the cooling liquid.

Generally, the heat exchanger and the expansion valve are separate parts, and the heat exchanger and the expansion valve are connected by pipes. This way of connecting through pipes may make the weight of an entire assembly heavier, which is not conducive to a vibration resistance of the entire assembly, and is apt to have a breakage problem of connecting pipes. In addition, in order to facilitate control of the system, a sensor is normally provided on an outlet pipe of the heat exchanger to collect relevant parameters of a working medium at the outlet of the heat exchanger, and then the sensor is connected to a control unit of the electronic expansion valve through wire harnesses. An opening degree of the electronic expansion valve is adjusted by the control unit according to a corresponding control program after obtaining relevant parameters, which involves a mechanical connection and an electrical connection of the sensor, and further causes a relatively complex structure of the entire system.

SUMMARY

A heat management assembly and a heat management system are provided, which is conducive to simplifying the structure.

In order to achieve the above objects, the following technical solution is provided according to an embodiment of the present application.

A heat management assembly, including a heat exchange core body and a valve component, where based on the heat exchange core body, the valve component is located above the heat exchange core body, and the heat exchange core body is fixedly connected to the valve component by welding; where the valve component includes a valve body, a valve core, a valve port, and a circuit board, and the valve core is movable relative to the valve port to adjust an opening degree of the valve port; the valve body includes a first flow channel and a second flow channel, which are communicated with each other and are located on both sides of the valve port; at least part of the first flow channel is located above the valve port, and at least part of the second flow channel is located below the valve port; where the valve body further includes a third flow channel, which is not communicated with the first flow channel and the second flow channel on the valve body; the valve component further includes a sensor, which is fixedly connected to the valve body and is electrically connected to the circuit board; at least part of the sensor extends into the third flow channel, and the sensor is capable of detecting a temperature and/or pressure of a working medium in the third flow channel; the heat exchange core body includes at least one positioning portion, and the valve body includes at least one matching portion, and the positioning portion and the matching portion are correspondingly provided for matching to define at least part of a relative position of the heat exchange core body and the valve body.

In the technical solution, the heat exchange core body and the valve component are fixedly connected by welding. The valve component further includes a sensor electrically connected to a circuit board, at least part of the sensor extends into the third flow channel, and the sensor is capable of detecting a temperature and/or pressure of a working medium in the third flow channel. The heat exchange core body includes at least one positioning portion, and the valve body includes at least one matching portion. The positioning portion and the matching portion are correspondingly provided for matching to define at least part of a relative position of the heat exchange core body and the valve body. Specifically, in a case that the valve body includes only one matching portion, the positioning portion and the matching portion are correspondingly provided for matching, so as to limit any one of the heat exchange core body and the valve body to move along a contact surface between the positioning portion and the matching portion. In a case that the valve body includes two or more matching portions, the positioning portion and the matching portions are correspondingly provided for matching, so as to limit a relative rotation between the heat exchange core body and the valve body and limit any one of the heat exchange core body and the valve body to move along a contact surface between the positioning portion and the matching portions. The sensor, the electronic expansion valve and the heat exchange core body are integrated and assembled together through above structure, which may facilitate to relatively reduce connections between pipelines and sensor circuits, and may further facilitate simplification of the structure.

DETAILED DESCRIPTION OF THIS EMBODIMENTS

The present application will be further described as follows in conjunction with the drawings and embodiments.

Figure 1:
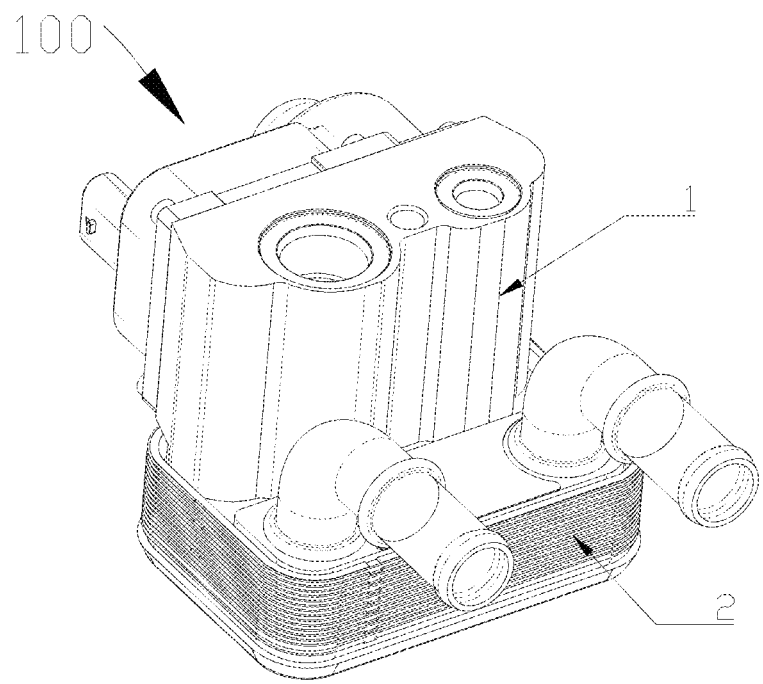
FIG. 1 is a schematic diagram of a three-dimensional structure of a first embodiment of a heat management assembly provided by the present application.
Figure 2:
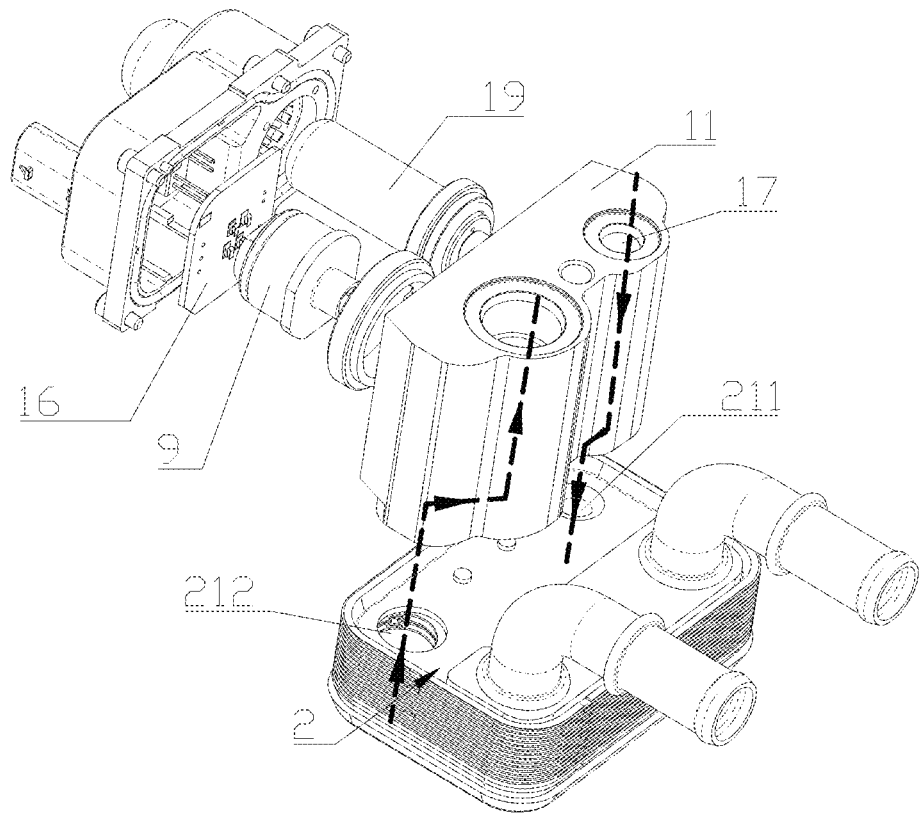
FIG. 2 is a schematic diagram of an explosive structure of the heat management assembly in FIG. 1, and a flow path of refrigerant is marked in the figure.
Figure 3:
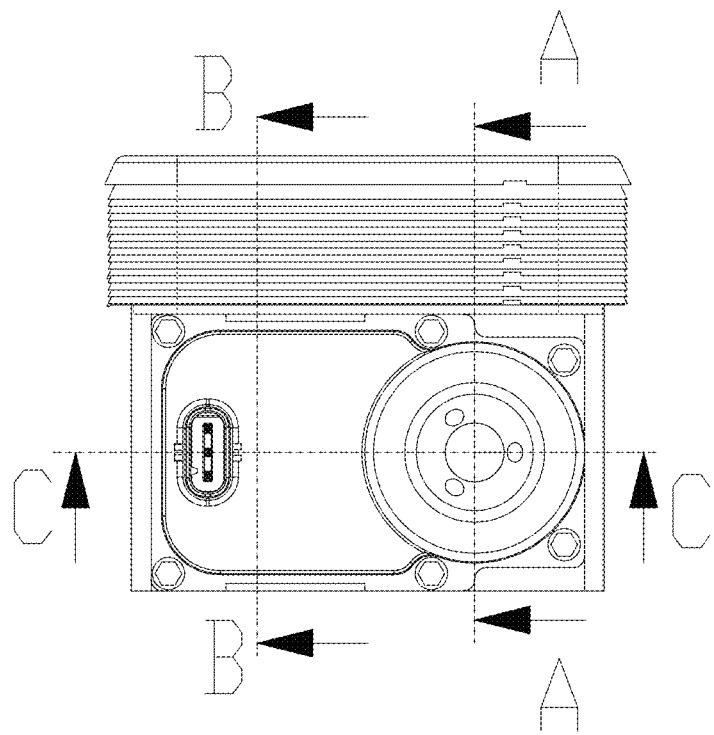
FIG. 3 is a schematic diagram of a front view structure of the heat management assembly in FIG. 1.
Figure 4:
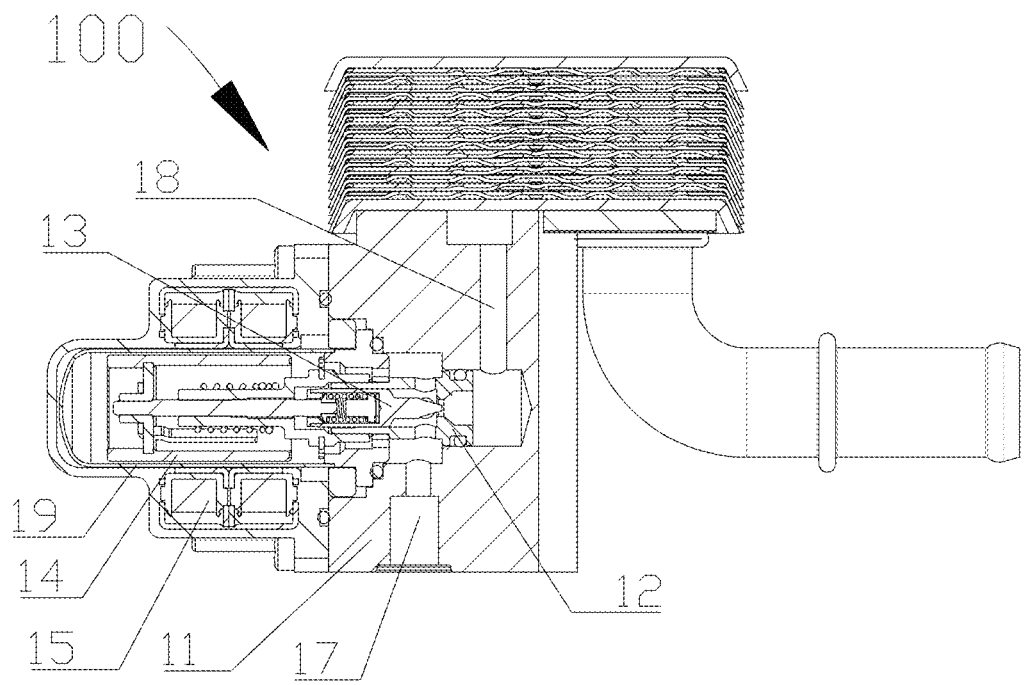
FIG. 4 is a schematic diagram of a cross-sectional structure along a A-A direction provided by the heat management assembly in FIG. 3.

Referring to FIGS. 1 and 2, a heat management assembly 100 includes a heat exchange core body 2 and a valve component 1. Based on a heat exchange core body 2, a valve component 1 is located above the heat exchange core body 2, and the heat exchange core body 2 is directly or indirectly connected, in a fixed manner, to the valve component 1; in this embodiment, the valve component 1 is a throttling device, which can realize a throttling effect and pressure reduction of a high-pressure refrigerant. Two kinds of fluids may flow inside the heat exchange core body 2, which are respectively a refrigerant and a cooling liquid isolated from each other in the heat exchange core body 2 and exchange heat in the heat exchange core body 2, so that the cooling liquid is cooled or heated. Referring to FIGS. 1 to 6, the valve component 1 includes a valve body 11, a valve core 13, a rotor component 14, a stator component 15 and a circuit board 16. The stator component 15 is mounted on an outer circumference of the rotor component 14. In this embodiment, a pipe 19 is provided between the stator component 15 and the rotor component 14 to isolate the stator component 15 and the rotor component 14. The stator component 15 is electrically connected to the circuit board 16. The valve component 1 further provided with a valve port 120 for communicating flow channels on both sides of the port 120. In this embodiment, the valve component 1 further includes a valve seat 12, which is arranged on an outer circumference of the valve core 13 and is provided with position limit. The valve port 120 is formed on the valve seat 12, and the valve core 13 changes a flow cross-sectional area of a working medium at the valve port 120 by approaching or getting away from the valve port 120, so that throttling may be formed at the valve port 120. During the valve component 1 is working, a current in a winding passing through the stator component 15 is controlled according to a predetermined pattern, so as to control the stator component 15 to generate a varying excitation magnetic field. The rotor component 14 rotates under the action of the excitation magnetic field, and the rotor component 14 is capable of driving the valve core 13 to move relative to the valve port 120 and adjusting an opening degree of the valve port 120. In this way, the rotor component is capable of driving the valve core to move relative to the valve port. An opening degree of the valve core relative to the valve port is controlled by the current through the stator component, which is beneficial to improve the accuracy of flow control.

Figure 5:
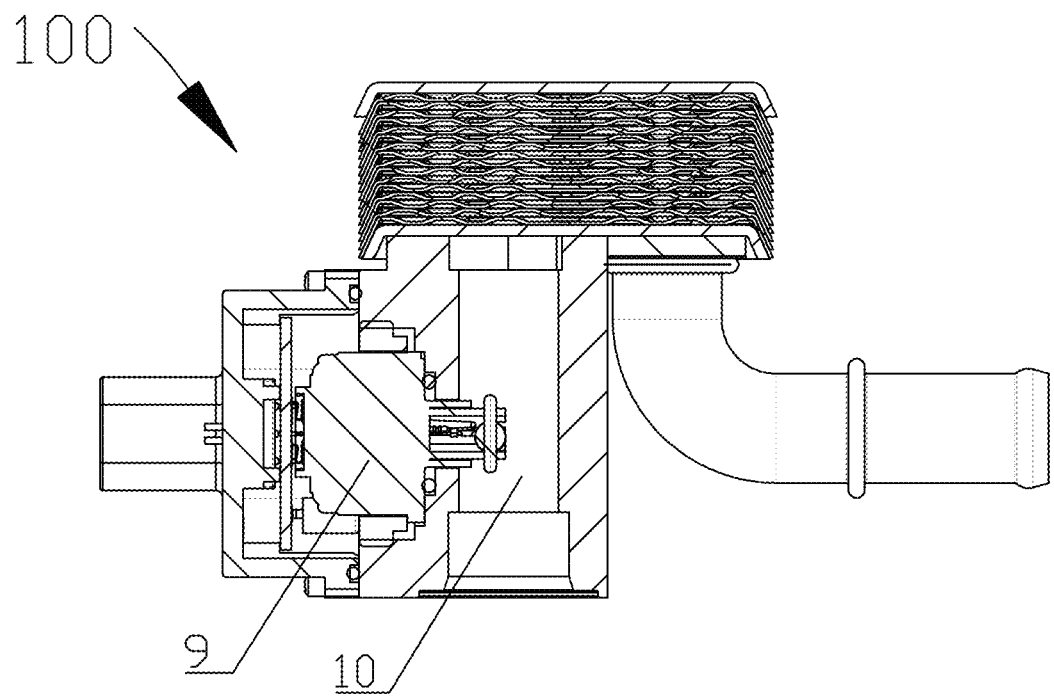
FIG. 5 is a schematic diagram of a cross-sectional structure along a B-B direction provided by the heat management assembly in FIG. 3.
Figure 6:
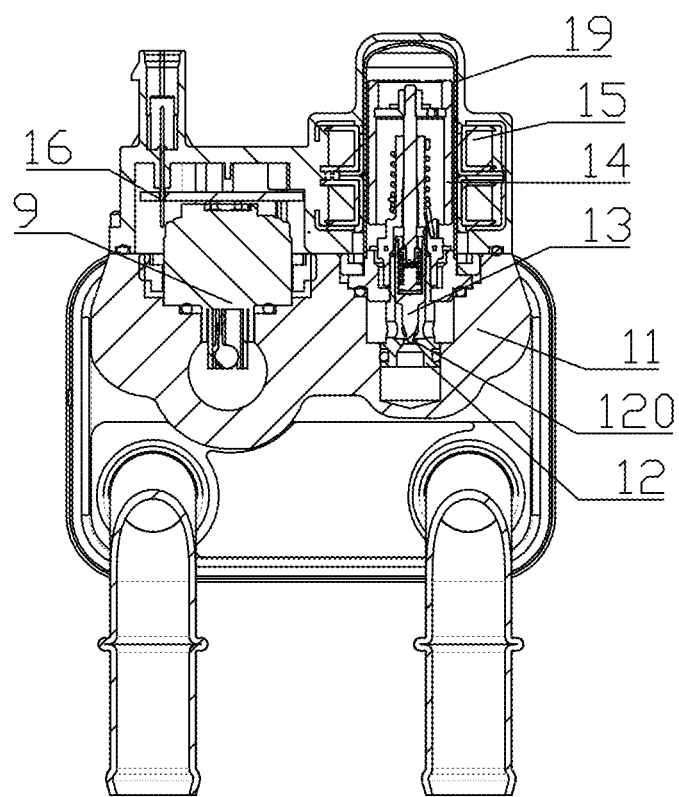
FIG. 6 is a schematic diagram of a cross-sectional structure along a C-C direction provided by the heat management assembly in FIG. 3.

Referring to FIGS. 1 to 10, the valve body 1 includes a first flow channel 17 and a second flow channel 18, which are respectively located on both sides of the valve port 120, and at least part of the first flow channel 17 is located above the valve port 120, at least part of the second flow channel 18 is located below the valve port 120, so that the refrigerant is capable of forming a throttling at the valve port 120. The valve body 11 further includes a third flow channel 10. Referring to FIGS. 2, 5 and 6, the valve component 1 further includes a sensor 9 electrically connected to the circuit board 16, and at least part of the sensor 9 extends into the third flow channel 10. The sensor 9 is capable of detecting the temperature and/or pressure of a working medium in the third flow channel 10. The sensor 9 is integrated and assembled in the valve component, which helps to relatively reduce electrical connections of the sensor circuit.

Figure 7:
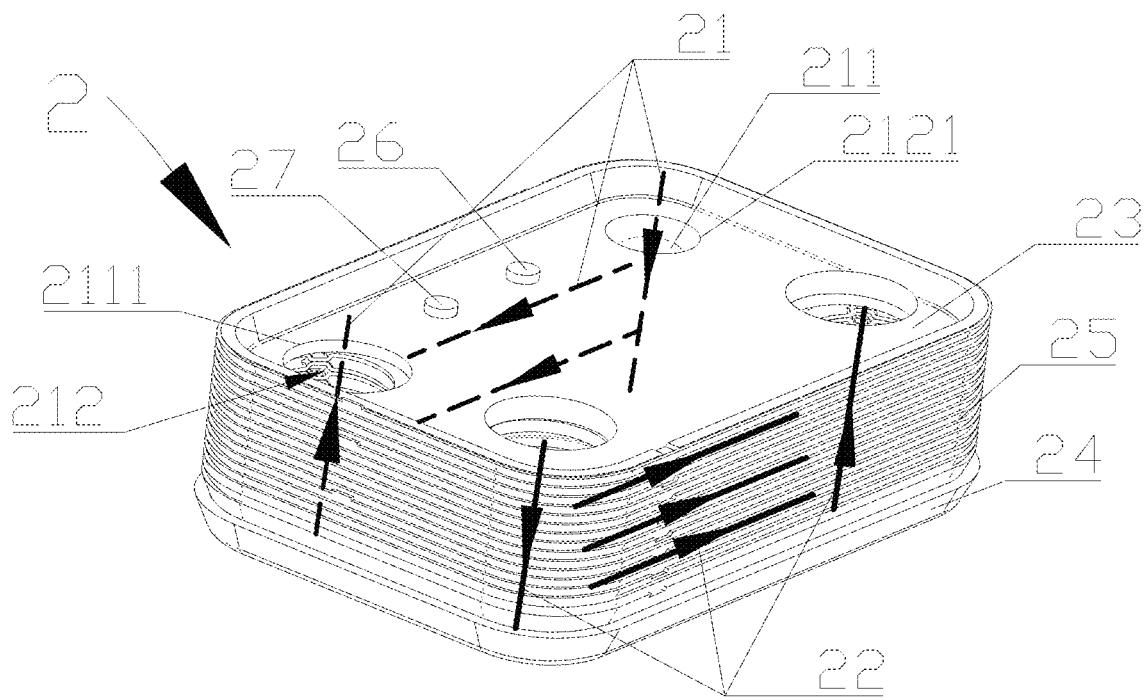
FIG. 7 is a schematic diagram of a three-dimensional structure of a heat exchange core body in FIG. 1 or FIG. 2, and flow paths of refrigerant and cooling liquid are marked in the figure.

Referring to FIG. 7, the heat exchange core body 2 includes a first fluid channel 21 and a second fluid channel 22. Two different fluids are respectively flow in the first fluid channel 21 and the second fluid channel 22. Specifically, the first fluid channel 21 is used for circulating a refrigerant, and the second fluid channel 22 is used for circulating a cooling liquid, and the first fluid channel and the second fluid channel are not communicated with each other. In order to facilitate the distinction, a path formed by a dashed line is a flow path of the refrigerant in the heat exchange core body, and a path formed by a solid line is a flow path of the cooling liquid. Referring to FIG. 7, the heat exchange core body 2 includes a bottom plate 24, an end plate 23, and a circulation plate 25. The bottom plate 24 and the end plate 23 are respectively located at both ends of the heat exchange core body. The circulation plate 25 is located between the bottom plate 24 and the end plate 23. The circulation plate 25 includes multiple first circulation plates (not shown) and multiple second circulation plates (not shown), and the multiple first circulation plates (not shown) and the multiple second circulation plates (not shown) are alternately stacked and arranged. A flow channel is formed between one first circulation plate (not shown) and one adjacent second circulation plate (not shown), so that fluid may flow in the flow channel formed between the first circulation plate (not shown) and the adjacent second circulation plate (not shown), which may further realize heat exchange of the cooling liquid and the refrigerant in the heat exchange core body. Referring to FIG. 7, the first fluid channel 21 includes a first drill way 211 and a second drill way 212. The first drill way 211 and the second drill way 212 are communicated with each other through the flow channel formed between the first circulation plate (not shown) and the adjacent second circulation plate (not shown).

In the present application, the heat exchange core body 2 and the valve component 1 are fixedly connected by welding. The sensor 9 is electrically connected to the circuit board 16 and is positioned and fixedly connected to the valve body 11, and at least part of the sensor 9 extends into the third flow channel 10. The sensor 9 is capable of detecting a temperature and/or pressure of a working medium in the third flow channel 10. The heat exchange core body 2 includes at least one positioning portion, and the valve body 1 includes at least one matching portion. The positioning portion and the matching portion are correspondingly provided for matching to define at least part of a relative position of the heat exchange core body 2 and the valve body 1. Specifically, in a case that the valve body 1 includes only one matching portion, the positioning portion and the matching portion are correspondingly provided for matching to limit any one of the heat exchange core body and the valve body to move along a contact surface between the heat exchange core body and the valve body. In a case that the valve body 1 includes two or more matching portions, the positioning portion and the matching portions are correspondingly provided for matching to limit a relative rotation between the heat exchange core body and the valve body and limit any one of the heat exchange core body and the valve body to move along a contact surface between the heat exchange core body and the valve body. The sensor, the electronic expansion valve and the heat exchange core body are integrated and assembled together through above structure, which may facilitate relatively reducing connections between pipelines and sensor circuits, and may further facilitate simplification of the structure and be easy to be installed.

In view of the foregoing description, a heat management assembly of the present application has four embodiments, and structures of the four embodiments of the heat management assembly in the present application will be described in detail below.

In order to facilitate the description of heat management assemblies of the following four embodiments, a heat management assembly of a first embodiment is designated as heat management assembly 100, and other reference numbers are not suffixed; a heat management assembly of a second embodiment is designated as heat management assembly 100a, other reference numbers are all suffixed with a letter a; a heat management assembly of a third embodiment is designated as heat management assembly 100b, other reference numbers are all suffixed with a letter b; a heat management assembly of the fourth embodiment is designated as heat management assembly 100c, other reference numbers are all suffixed with a letter c.

Referring to FIGS. 1 to 10, FIGS. 1 to 10 are structural schematic diagrams of the first embodiment of the heat management assembly provided by the present application; the structure of the first embodiment of the heat management assembly provided by the present application will be described in detail below.

Referring to FIGS. 1 to 10, in this embodiment, the heat exchange core body 2 is directly and fixedly connected to the valve component 1. Specifically, a valve body 11 in the valve component 1 and an end plate 23 in the heat exchange core body 2 are fixedly connected by welding, which may realize a fixed connection between the valve body and the end plate without providing an adapter, and may beneficial to relatively reduce an overall height of the heat management assembly, thereby facilitating a lightweight of the heat management assembly.

Figure 8:
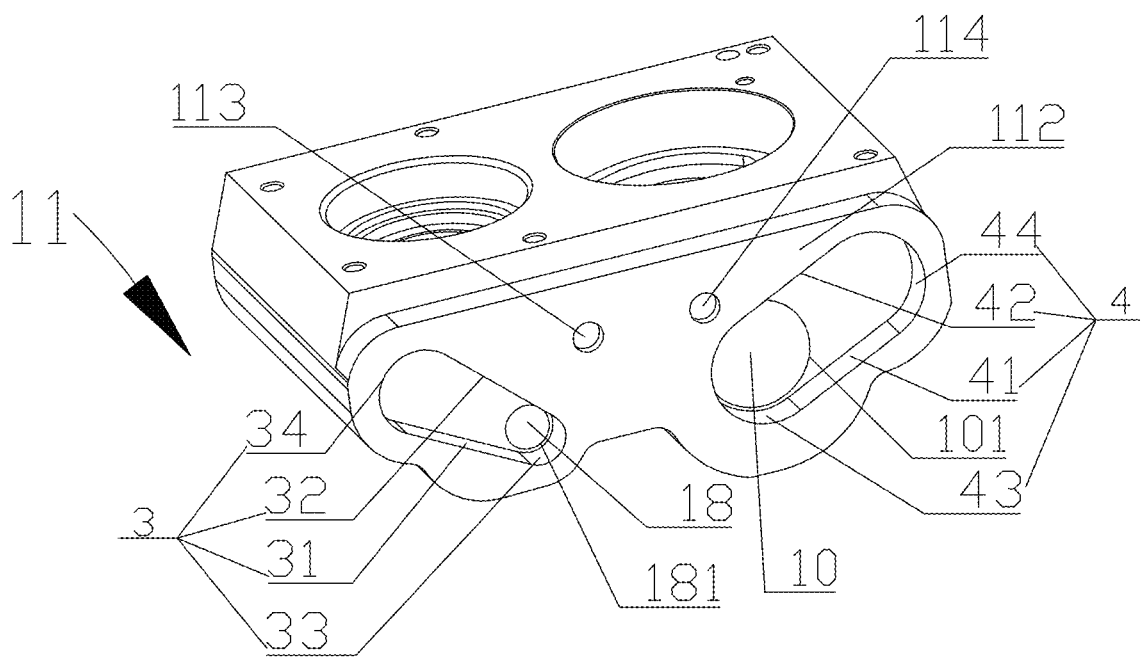
FIG. 8 is a schematic diagram of a three-dimensional structure of a valve body in FIG. 1 or FIG. 2 in one direction.

Referring to FIG. 8, the valve body 11 includes a first wall surface 111 and a second wall surface 112, which are respectively located on both sides of the valve body and are provided in parallel. An inlet hole (not shown) of the first flow channel 17 is formed on the first wall surface 111, and an outlet hole (not shown) of the second flow channel 18 is formed on the second wall surface 112. In this embodiment, the valve body 11 includes two matching portions, and one of the two matching portions is defined as a first matching portion 113, and the other of the two matching portions is defined as a second matching portion 114. The first matching portion 113 and the second matching portion 114 are both in a shape of hole, and extend along a direction from the second wall surface 112 to the first wall surface 111, and are both provided between the second flow channel 18 and the third flow channel 10. Referring to FIG. 7, the heat exchange core body 2 includes two positioning portions, and one of the two positioning portions is defined as a first positioning portion 26, and the other of the two positioning portions is defined as a second positioning portion 27, both of which protrude from an upper surface of the heat exchange core body 2 and are provided between the first drill way 211 and the second drill way 212. With reference to FIGS. 1 and 2, the first positioning portion 26 and the first matching portion 113 are arranged in a clearance fit, the second positioning portion 27 and the second matching portion 114 are arranged in a clearance fit. In this embodiment, a protrusion height of the first positioning portion 26 is smaller than a depth of the first matching portion 113, and a protrusion height of the second positioning portion 27 is smaller than a depth of the second matching portion 114, herein, that "protrusion heights of the first positioning portion 26 and the second positioning portion 27" is a thicknesses of the first positioning portion 26 and the second positioning portion 27, and that "depths of the first matching portion 113 and the second matching portion 114" is a thicknesses of the first matching portion 113 and the second matching portion 114, which is equivalent to take the second wall surface 112 of the valve body as a positioning reference, and makes the valve body and the heat exchange core body be installed in place.

Referring to FIG. 8, the valve body 11 further includes a first groove 3 and a second groove 4, which are recessed along a direction from the second wall 112 to the first wall 111 and do not penetrate the first wall surface 111. The first groove 3 is communicated with the second flow channel 18, and the second groove 4 is communicated with the third flow channel 10. The first matching portion 113 and the second matching portion 114 are located between the first groove 3 and the second groove 4. Referring to FIGS. 1 to 10, the first groove 3 and the second groove 4 are arranged obliquely with respect to a center line L1 of the valve core 13. As shown in FIG. 8, the first groove 3 and the groove 4 are arranged roughly in a splayed shape. The second flow channel 18 and the first drill way 211 of the heat exchange core body are communicated with each other through the first groove 3, and the third flow channel 10 and the second drill way 212 of the heat exchange core body are communicated with each other through the second groove 4, which realize a communication of flow channels between the valve component 1 and the heat exchange core body 2, so that the valve component 1 and the heat exchange core body 2 may be integrated as a whole part.

Referring to FIG. 8, in this embodiment, depths of the first groove 3 and the second groove 4 are greater than or equal to 5 mm and less than or equal to 6 mm, so that in the premise that communication between the valve component 1 and the heat exchange core body 2 may be ensured, it is beneficial to relatively reduce a pressure drop of fluid in the first groove 3 and the second groove 4, and further beneficial to relatively reduce a flow resistance of the fluid in the first groove 3 and the second groove 4.

Figure 9:
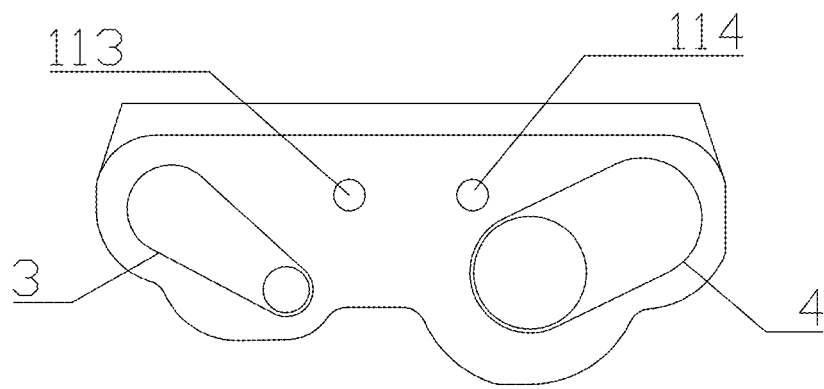
FIG. 9 is a schematic diagram of a front view structure of the valve body in FIG. 8.
Figure 10:
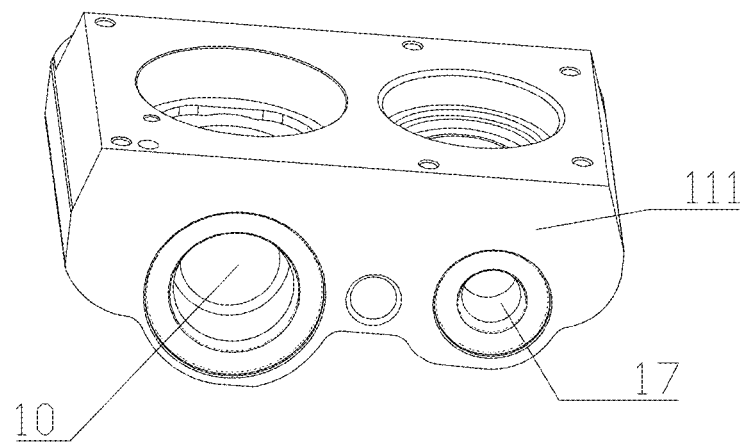
FIG. 10 is a schematic diagram of a three-dimensional structure of a valve body in FIG. 1 or FIG. 2 in another direction.

Referring to FIGS. 8 and 9, the first groove 3 includes a first side surface 31 and a second side surface 32, which are planar. One end of the first side surface 31 and one end of the second side surface 32 are connected through a first arc surface 33, herein, that "one end of the first side surface 31 and one end of the second side surface 32" are located on the same side, and the other end of the first side surface 31 and the other end of the second side surface 32 are connected through a second arc surface 34, herein, that "the other end of the first side surface 31 and the other end of the second side surface 32" are located on the same side, and the above two sides are different sides. With reference to FIGS. 1, 2, 7 and 8, in this embodiment, the first arc surface 33 is closer to an outlet hole 181 of the second flow channel 18 than the second arc surface 34. A radius of the second arc surface 34 is larger than a radius of the first arc surface 33, and a radius of the first arc surface 33 is larger a radius of an outlet hole 181 of the second flow channel 18 of the valve body. Of course, the radius of the first arc surface 33 may also be equal to the radius of the outlet hole 181 of the second flow channel 18 of the valve body, and a radius of the second arc surface 34 is larger than a radius of an inlet hole 2111 of the first drill way 211 of the heat exchange core body. Of course, the radius of the second arc surface 34 may also be equal to the radius of the inlet hole 2111 of the first drill way 211 of the heat exchange core body, which is conducive to the circulation of the refrigerant. The outlet hole 181 of the second flow channel 18 and the inlet hole 2111 of the first drill way 211 are projected onto the first groove 3, and a projection of the outlet hole 181 of the second flow channel 18 and a projection of the inlet hole 2111 of the first drill way 211 are located inside the first groove 3. In this way, the second flow channel 18 and the first drill way 211 are communicated with each other through the first groove 3. The second groove 4 includes a third side surface 41 and a fourth side surface 42, which are planar. One end of the third side surface 41 and one end of the fourth side surface 42 are connected through a third arc surface 43, herein, that "one end of the third side surface 41 and one end of the fourth side surface 42" are located on the same side, and the other end of the third side surface 41 and the other end of the fourth side surface 42 are connected through a fourth arc surface 34, herein, that "the other end of the third side surface 41 and the other end of the fourth side surface 42" are located on the same side, and the above two sides are different sides. In this embodiment, a radius of the third arc surface 43 equals to a radius of the fourth arc surface 44. Of course, the radius of the third arc surface 43 may be smaller than the radius of the fourth arc surface 44, and a radius of the third surface 43 is larger than a radius of an inlet hole 101 of the third flow channel 10, and a radius of the fourth arc surface is larger than a radius of an outlet hole 2121 of the second drill way 212. The third arc surface is closer to an inlet hole 101 of the third flow channel 10 of the valve body than the fourth arc surface. The inlet hole 101 of the third flow channel 10 and the outlet hole 2121 of the second drill way 212 are projected onto the second groove 4, and a projection of the inlet hole 101 of the third flow channel 10 and a projection of the outlet hole 2121 of the second drill way 212 are located inside the second groove 4. In this way, the third flow channel 10 and the second drill way 212 are communicated with each other through the second groove 4.

Referring to FIGS. 1 and 2, in this embodiment, the valve component 1 is relatively provided along a length direction of the heat exchange core body. Specifically, the first flow channel 17 of the valve body 11 and the third flow channel 10 of the valve body are relatively provided along the length direction of the heat exchange core body. In addition, part of the valve component 1 extends out of the heat exchange core body 2. Specifically, a casing in the valve component 1, which is fixedly connected to the valve body 11, relatively extends out of the heat exchange core body 2, along a width direction of the heat exchange core body 2. In this way, a structure of the heat management assembly relatively is relatively compact. In addition, in this embodiment, a connecting pipe of the heat exchange core body 2 and the valve component 1 are located on the same side of the main body of the heat exchange core body 2. Of course, the connecting pipe of the heat exchange core body 2 and the valve component 1 may also be located on different sides of the main body of the heat exchange core body 2.

Referring to FIGS. 11 to 18, FIGS. 11 to 18 are schematic diagrams of a structure of the second embodiment of the heat management assembly in the present application, and the structure of the second embodiment of the heat management assembly in the present application is described in detail below.

Figure 11:
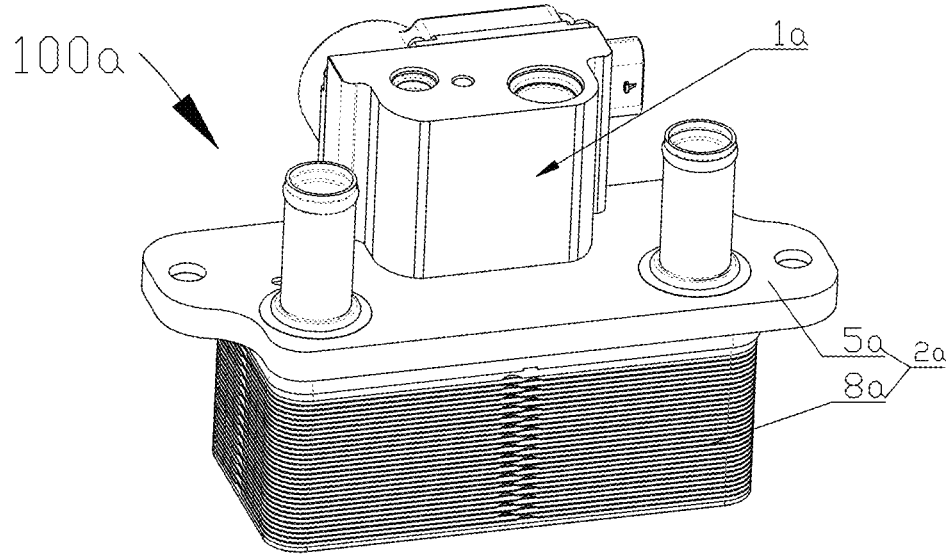
FIG. 11 is a schematic diagram of a three-dimensional structure of a second embodiment of a heat management assembly provided by the present application.
Figure 12:
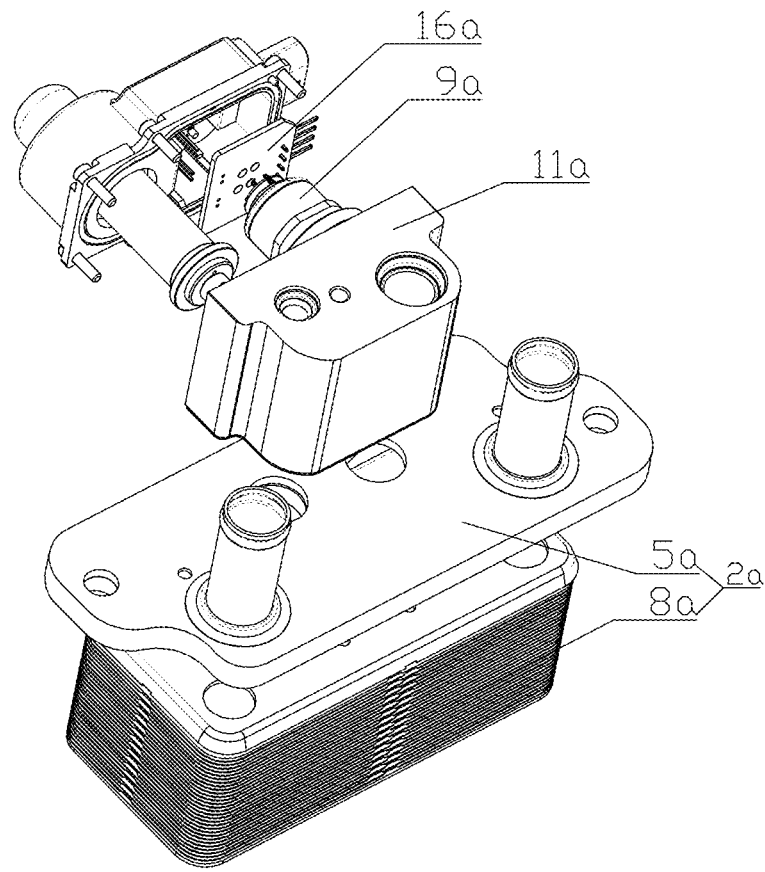
FIG. 12 is a schematic diagram of an explosive structure of the heat management assembly in FIG. 11.
Figure 13:
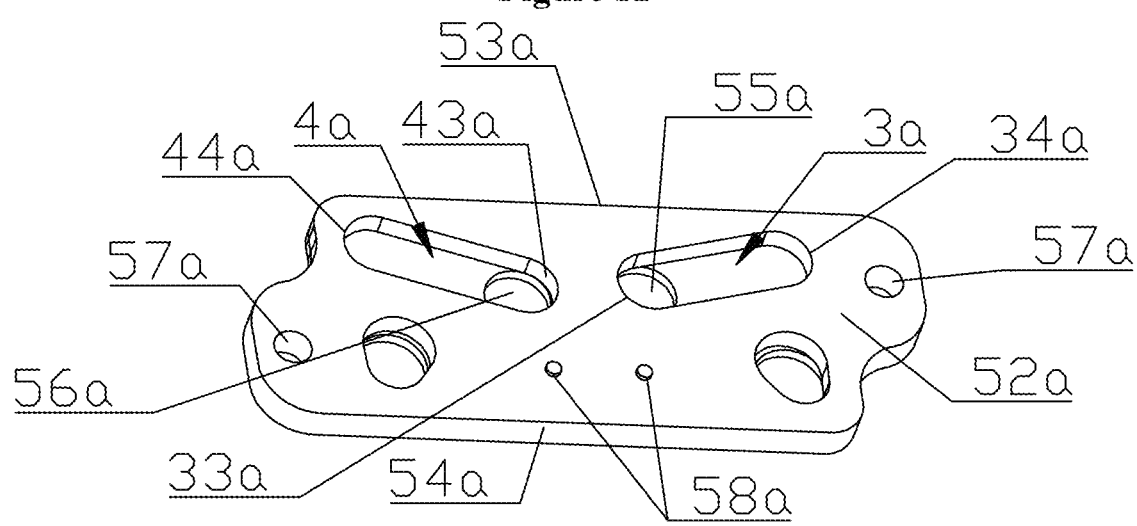
FIG. 13 is a schematic diagram of a three-dimensional structure of a mounting plate in FIG. 11 in one direction.

Referring to FIGS. 11 to 18, a heat exchange core body 2a includes a heat exchange main body 8a and a mounting plate 5a. The mounting plate 5a is provided between the heat exchange main body 8a and a valve component 1a, and the heat exchange main body 8a and the mounting plate 5a are positioned and fixed connected by welding. Specifically, the mounting plate 5a includes a top surface 51a and a bottom surface 52a, which are respectively located on both sides of the mounting plate 5a. The top surface 51a and the bottom surface 52a are provided opposite to each other. In this embodiment, the valve body 11a and the top surface 51a of the mounting plate are fixedly connected by welding, and the heat exchange core body 2a and the bottom surface 52a of the mounting plate are fixedly connected by welding. Of course, the valve body 11a and the mounting plate 5a may also be connected by other connection method, such as by screws or bolts. Referring to FIG. 13, the mounting plate 5a includes two protrusion sections 58a, which protrude from the bottom surface 52a of the mounting plate. Corresponding to the protrusions 58a, two holes are formed on the upper surface of the heat exchange main body 8a. The two holes on the upper surface of the heat exchange main body 8a are matched with the two protrusion sections 58a, so that the mounting plate 5a and the heat exchange main body 8a may be positioned and arranged. In this embodiment, the valve body 11a and the heat exchange core body 2a are indirectly fixedly connected as a whole body by providing the mounting plate 5a, which further enables the valve component 1a and the heat exchange core body 2a to be integrated into a whole body, which is beneficial to relatively reduce the arrangement of pipelines in the system, thereby simplifying the structure and facilitating installation.

Figure 14:
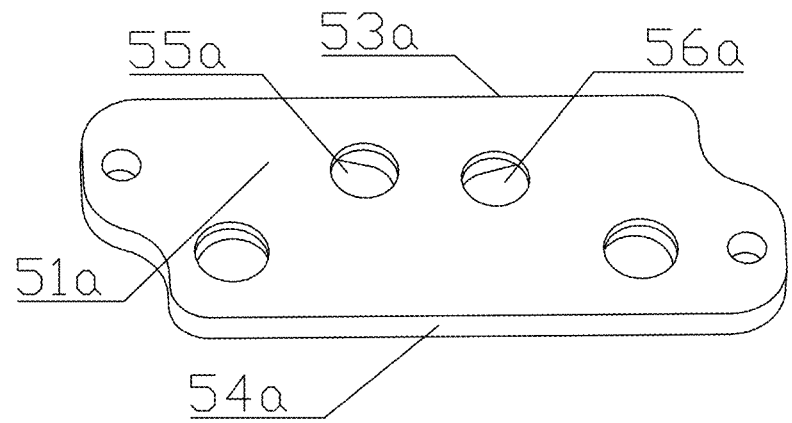
FIG. 14 is a schematic diagram of a three-dimensional structure of a mounting plate in FIG. 11 in another direction.
Figure 15:
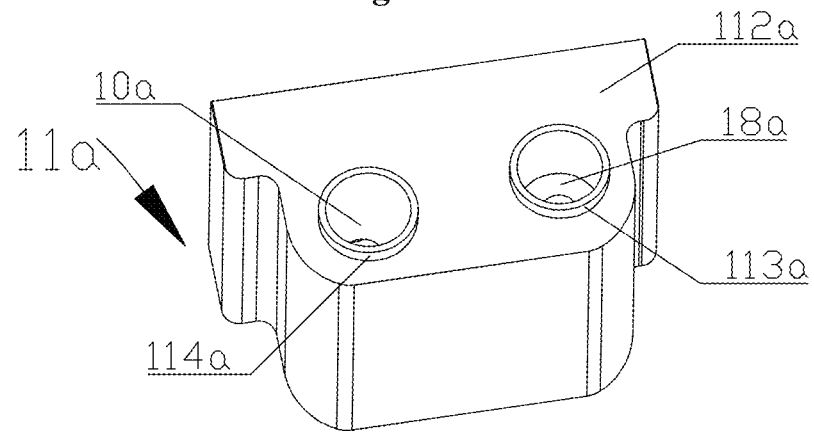
FIG. 15 is a schematic diagram of a three-dimensional structure of the valve body in FIG. 11.
Figure 16:
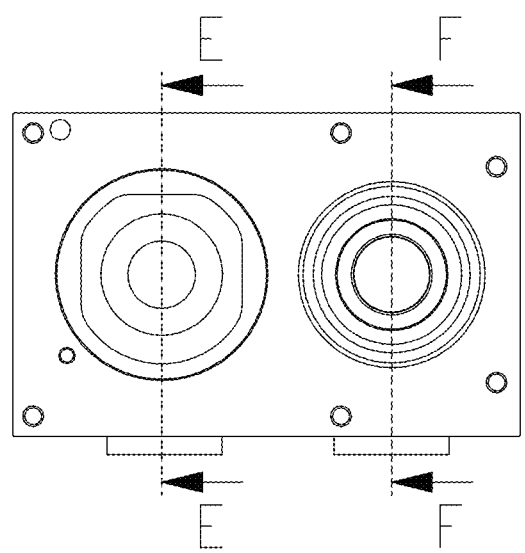
FIG. 16 is a schematic diagram of a front view structure of the valve body in FIG. 15.
Figure 17:
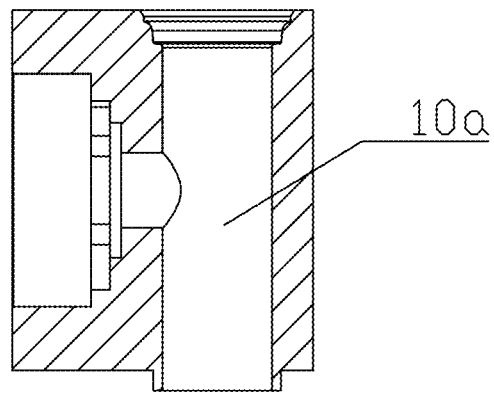
FIG. 17 is a schematic diagram of a cross-sectional structure along a E-E direction of the valve body in FIG. 16.
Figure 18:
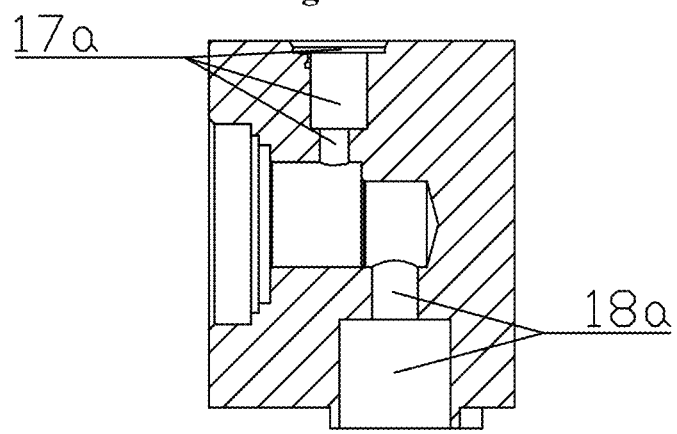
FIG. 18 is a schematic diagram of a cross-sectional structure along a F-F direction of the valve body in FIG. 16.
Figure 19:
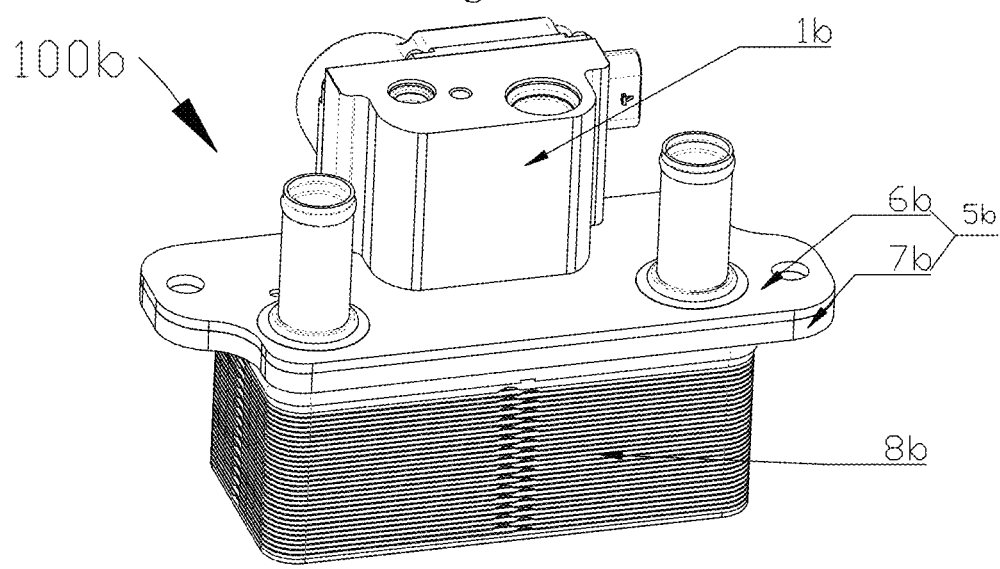
FIG. 19 is a schematic diagram of a three-dimensional structure of a third embodiment of a heat management assembly provided by the present application.
Figure 20:
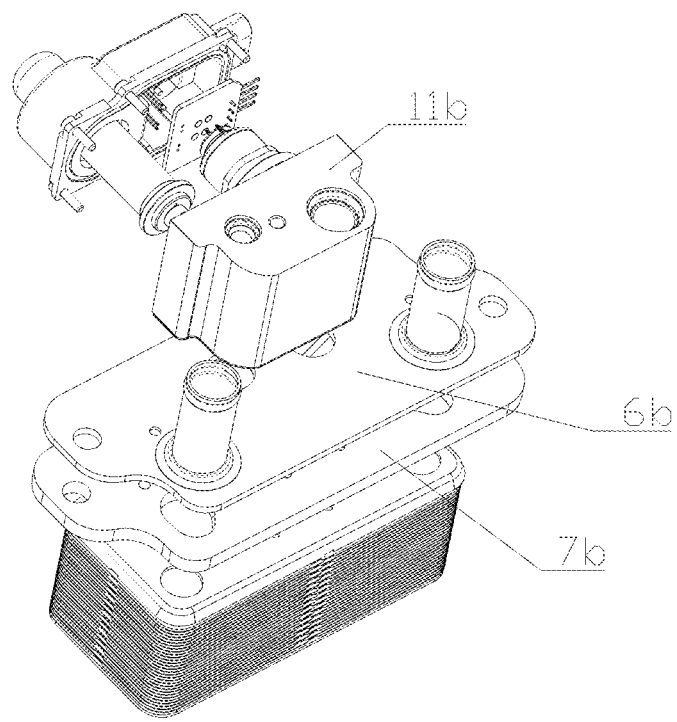
FIG. 20 is a schematic diagram of an explosive structure of the heat management assembly in FIG. 19.
Figure 21:
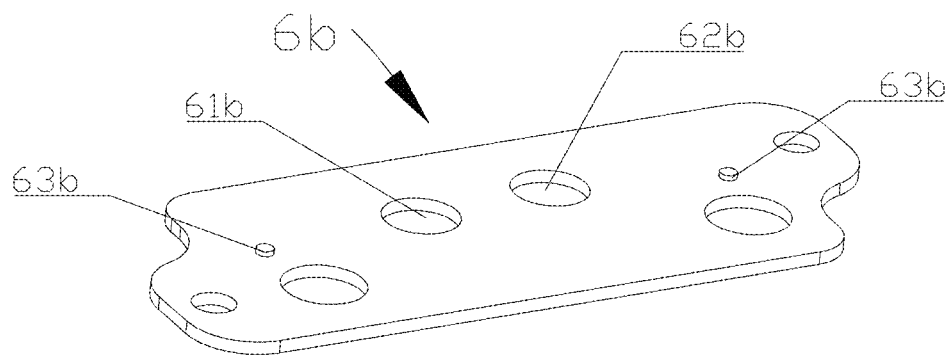
FIG. 21 is a schematic diagram of a three-dimensional structure of a first plate sheet in FIG. 19 or FIG. 20.
Figure 22:
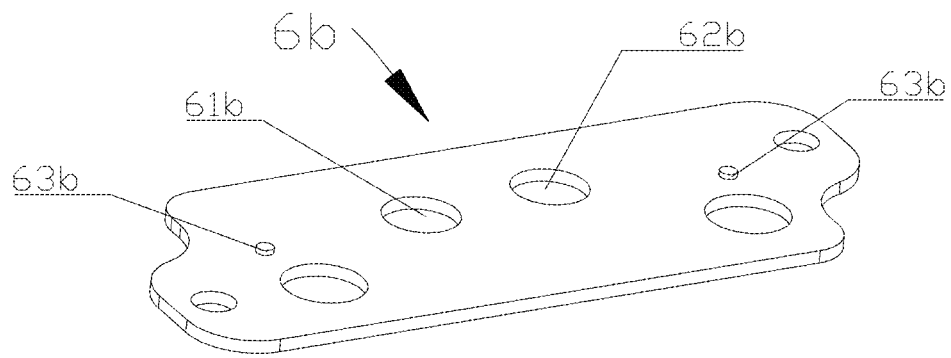
FIG. 22 is a schematic diagram of a three-dimensional structure of a second plate sheet in FIG. 19 or FIG. 20.
Figure 23:
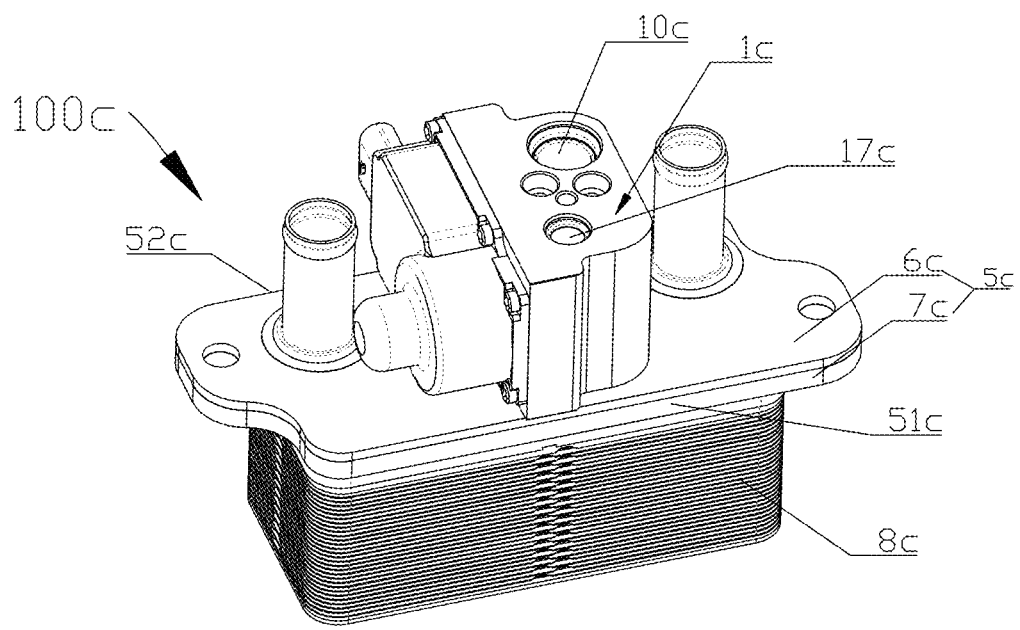
FIG. 23 is a schematic diagram of a three-dimensional structure of a fourth embodiment of a heat management assembly provided by the present application.

Referring to FIGS. 11 to 18, the heat exchange core body 2a includes two positioning portions, and one of the two positioning portions is defined as a first positioning portion 55a, and the other of the two positioning portions is defined as a second positioning portion 56a. Referring to FIGS. 13 and 14, in this embodiment, the first positioning portion 55a and the second positioning portion 56a are formed on the mounting plate 5a and are both hole-shaped. The first positioning portion 55a and the second positioning portion 56a both extend along a direction from the top surface 51a of the mounting plate 5a the bottom surface 52a of the mounting plate 5a. Referring to FIG. 15, the valve body 11a includes two matching portions, and one of the two matching portions is defined as a first matching portion 113a, and the other of the two matching portions is defined as a second matching portion 114a, which protrude from the second wall surface 112a in a direction away from the second wall surface 112a. The first matching portion 113a and the second matching portion 114a are ring-shaped, and the first matching portion 113a is communicated with the second flow channel 18a, and the second matching portion 114a is communicated with the third flow channel 10a. In this embodiment, at least part of the first matching portion 113a is inserted into the first positioning portion 55a and in clearance fit with the first positioning portion 55a, and at least part of the second matching portion 114a is inserted into the second positioning portion 56a and in clearance fit with the second positioning portion 56a. A protrusion height of the first matching portion 113a is smaller than a depth of the first positioning portion 55a. A protrusion height is smaller than a depth of the second positioning portion 56a, herein, that "protrusion heights of the first matching portion 113a and the second matching portion 114a" is a thicknesses of the first matching portion 113a and the second matching portion 114a, that "depths of the first positioning portion 56a and the second positioning portion 57a" is a thicknesses of the first positioning portion 56a and the second positioning portion 57a, which is equivalent to take the second wall surface 112a of the valve body as a positioning reference and makes the valve body and the heat exchange core body 2a be installed in place.

Referring to FIG. 13, the mounting plate 5a includes a first groove 3a and a second groove 4a, which are recessed along a direction from the bottom surface 52a to the top surface 51a and do not penetrate the top surface 51a. The first positioning portion 55a is defined to be located above the first groove 3a, and the second positioning portion 56a is defined to be located above the second groove 4a. The first positioning portion 55a is communicated with the first groove, and the second positioning portion 56a is communicated with the second groove 4a, which may ensure the second flow channel 18a to be communicated with the first groove 3a, and the third flow channel 10a to be communicated with the second groove 4a, so that the second flow channel 18a is communicated with the first channel 211 of the heat exchange core body, and the third flow channel 10a is communicated with the second channel 212 of the heat exchange core body 2a.

Referring to FIGS. 11 to 13, the mounting plate 5a includes a first outer wall 53a and a second outer wall 54a, which are respectively located on both sides of the mounting plate. The first outer wall 53a and the second outer wall 54a are provided opposite to each other and both arranged along a length direction of the mounting plate 5a. With reference to FIG. 11, in this embodiment, the valve component 1a is provided relatively closer to the first outer wall 53a of the mounting plate 5a, and part of the valve component 1a protrudes from the first outer wall 53a of the mounting plate 5, along a width direction of the heat exchange core body 2a. Referring to FIGS. 13 and 14, the first groove 3a and the second groove 4a are arranged obliquely with respect to the first outer wall 53a or the second outer wall 54a. Specifically, the first groove 3a and the second groove 4a are arranged roughly in a splayed shape. A depth of the first groove 3a and a depth of the second groove 4a are greater than or equal to 5 mm and less than or equal to 6 mm. In the premise that the valve component 1a may be connected to the heat exchange core body 2a, it is beneficial to relatively reduce a pressure drop of the fluid in the first groove 3a and the second groove 4a, and thus to relatively reduce a flow resistance of the fluid in the first groove 3a and the second groove 4a. In addition, in this embodiment, depths of the first positioning portion 55a and the second positioning portion 56a are respectively smaller than depths of the first groove 3a and the second groove 4a. Of course, depths of the first positioning portion 55a and the second positioning portion 56a are may be respectively larger than or equal to depths of the first groove 3a and the second groove 4a.

Referring to FIGS. 11 to 15, in this embodiment, the first positioning portion 55a is closer to the first arc surface 33a than the second arc surface 34a, and the second positioning portion 56a is closer to the fourth arc surface 44a than the third arc surface 43a. In addition, in this embodiment, radiuses of the first arc surface 33a and the second arc surface 34a of the first groove 3a are equal, and radiuses of the third arc surface 43a and the fourth arc surface 44a of the second groove 4a are equal. Of course, a radius of the second arc surface 33a may also be larger than a radius of the first arc surface 33a, and a radius of the fourth arc surface 44a may also be larger than a radius of the third arc surface 43a, which is beneficial to the smoothness of fluid flow. For other shape features of the first groove 3a and the second groove 4a, reference can be made to the first embodiment, which will not be repeated here.

Referring to FIGS. 7 and 11 to 18, the second flow channel 18a of the valve body 11a and the first drill way 211 of the heat exchange core body 2a are communicated with each other through the first groove 3a, and the third flow channel 10a of the valve body 11a and the second drill way 212 of the heat exchange core body 2a are communicated with each other through the second groove 4a, which realizes the communication of flow channels between the valve component 1a and the heat exchange core body 2a, so that the valve component 1a and the heat exchange core body 2a may be integrated as a whole. The valve component 1 further includes a sensor 9a, which is electrically connected to a circuit board 16a. At least part of the sensor 9a extends into the third flow channel 10a of the valve body 11a. The sensor 9a is capable of detecting the temperature and/or pressure of working medium in the third flow channel 10a, so that the sensor is integrated and assembled in the valve component 1a, which is beneficial to relatively reduce electrical connections of the sensor circuit.

Referring to FIGS. 13 and 14, the mounting plate 5a also includes a mounting hole 57a penetrating the top surface 51a and the bottom surface 52a of the mounting plate 5a. The mounting hole 57a is used for installing the heat management assembly and an external system, so that the heat management assembly is more convenient to be installed with the external system. Specifically, in FIG. 11, both ends of the mounting plate 5a in a length direction thereof protrude relative to the heat exchange core body 2a to form lugs, and the mounting hole 57a is corresponding to the lugs.

Compared with the first embodiment of the heat management assembly, in this embodiment, the heat management assembly includes the mounting plate 5a. The valve body 11a and the heat exchange core body 2a are fixedly connected through the mounting plate 5a. The first positioning portion 55a and the second positioning portions 56a are formed on the mounting plate 5a, and the first positioning portion 55a and the second positioning portion 56a are hole-shaped, and the first matching portion 113a and the second matching portion 114a are both ring-shaped with protrusion. For other features in this embodiment, reference is made to the first embodiment, which will not be repeated here.

Referring to FIGS. 19 to 22, FIGS. 19 to 22 are schematic diagrams of a structure of the third embodiment of the heat management assembly in the present application, and the structure of the third embodiment of the heat management assembly in the present application is described in detail below.

Referring to FIGS. 19 to 22, a mounting plate 5b further includes a first plate sheet 6b and a second plate sheet 7b, which are provided between a valve body 1b and a heat exchange main body 8b. The first plate sheet 6b is fixedly connected to the second plate sheet 7b. Specifically, in this embodiment, the first plate sheet 6b and the second plate sheet 7b are positioned and fixedly connected by welding. Of course, the first plate sheet 6b and the second plate sheet 7b may also be connected by other connection method, such as by screws or bolts, and a positioning of the first plate sheet 6b and the second plate sheet 7b may be realized by a matched arrangement of a protrusion section 63b of the first plate sheet 6b and a through hole 71b of the second plate sheet 7b. Referring to FIGS. 19 to 22, the valve body 11b and the first plate sheet 6b are fixedly connected by welding, and the heat exchange main body 8b and the second plate sheet 7b are fixedly connected by welding, so that the valve body 11b and the heat exchange main body 8b are indirectly fixedly connected as a whole, so that the valve component 1b may be integrated with the heat exchange main body 8b as a whole, which is beneficial to relatively reduce the arrangement of pipelines in the system, thereby simplifying the structure and facilitating installation.

Referring to FIGS. 19 to 22, in this embodiment, a first positioning portion 61b and a second positioning portion 62b are formed on the first plate sheet 6b, which are arranged along a length direction of the first plate sheet 6b and penetrate upper and lower surfaces of the first plate sheet 6b. The second plate sheet 7b includes a first groove 3b and a second groove 4b, and the first groove 3b and the second groove 4b penetrate upper and lower surfaces of the second plate sheet 7b. The first positioning portion 61b is communicated with a first groove 3b, and the second positioning portion 62b is communicated with the second groove 4b. In this embodiment, the heat management assembly 100b only includes one first plate sheet 6b and one second plate sheet 7b. Of course, it may also include two or more first plate sheets 6b and two or more second plate sheets 7b. After that, the first groove 3b, the second groove 4b, the first positioning portion 61b and the second positioning portion 62b are formed by stacking.

Compared with the first embodiment of the heat management assembly, in this embodiment, the heat management assembly 100b includes the first plate sheet 6b and the second plate sheet 7b, which are fixedly connected to each other. The positioning portion 61b and the second positioning portion 62b are formed on the first plate sheet 6b, and the first groove 3b and the second groove 4b are formed on the second plate sheet 7b. The first plate sheet 6b and the second plate sheet 7b are fixed, which is equivalent to the mounting plate 5c in the second embodiment. For other features in this embodiment, reference can be made to the second embodiment, which will not be repeated here.

Referring to FIGS. 23 to 26, FIGS. 23 to 26 are schematic diagrams of a structure of a fourth embodiment of the heat management assembly in the present application, and the structure of the fourth embodiment of the heat management assembly in the present application is described in detail below.

Referring to FIGS. 23 to 26, in this embodiment, a heat management assembly 100c further includes a mounting plate 5c, which is provided between the valve body 1c and the heat exchange body 8c., and is fixedly connected to a top surface of the mounting plate 5c by welding. The heat exchange core body 2c is fixedly connected to a bottom surface of the mounting plate 5c by welding. The mounting plate 5c includes a first outer wall 51c and a second outer wall 52c, which are located on both sides of the mounting plate, and are provided opposite to each other, and are arranged along a length direction of the mounting plate. In this embodiment, a first groove 3c and a second groove 4c are formed on the mounting plate 5c. The first groove 3c is parallel to the first outer wall 51c or the second outer wall 52c, and the second groove 4c is arranged obliquely with respect to the first outer wall 51c or the second outer wall 52c. Specifically, referring to FIGS. 23 to 26, the mounting plate 5c includes a first plate sheet 6c and a second plate sheet 7c. The first plate sheet 6c and the second plate sheet 7c are fixedly connected by welding. The valve body 11c and the first plate sheet 6c are fixedly connected by welding, and the heat exchange body 8c is fixedly connected with the second plate sheet 7c by welding, so that the valve body 11c and the heat exchange main body 8c are indirectly fixedly connected as a whole, so that the valve component 1c may be integrated with the heat exchange main body 8c as a whole, which is beneficial to reduce the arrangement of pipelines in the system, thereby simplifying the structure and facilitating installation.

Figure 26:
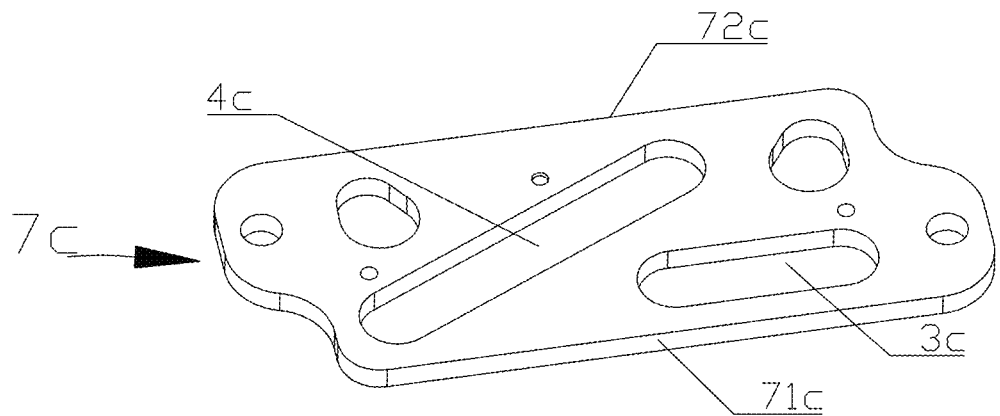
FIG. 26 is a schematic diagram of a three-dimensional structure of a second plate sheet in FIG. 23 or FIG. 24.

Referring to FIG. 26, in this embodiment, the first groove 3c and the second groove 4c are formed on the second plate 7c, and both penetrate the upper and lower surfaces of the second plate sheet 7c. The groove 3c is parallel to a first outer wall 71c of the second plate sheet 7c or a second outer wall 72c of the second plate sheet 7c, and the second groove 4c is provided obliquely with respect to the first outer wall 71c or the second outer wall 72c of the second plate sheet 7c. A thickness of the first groove 3c and a thickness of the second groove 4c are greater than or equal to 5 mm and less than or equal to 6 mm. In the premise that the valve component 1c may be connected to the heat exchange core body 2c, it is beneficial to relatively reduce a pressure drop of the fluid in the first groove 3c and the second groove 4c, and thus to relatively reduce a flow resistance of the fluid in the first groove 3c and the second groove 4c. For shape features of the first groove and the second groove, reference can be made to the second embodiment, which will not be repeated here.

Figure 25:
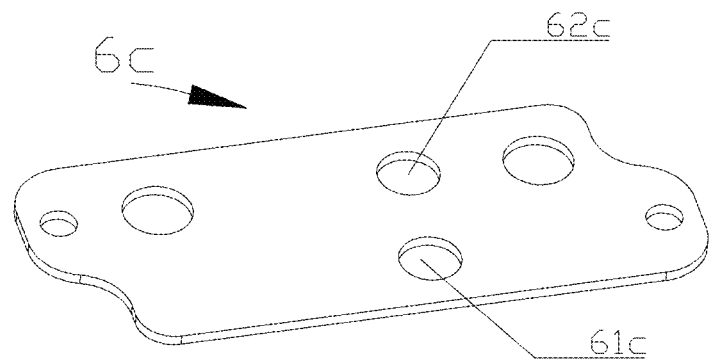
FIG. 25 is a schematic diagram of a three-dimensional structure of the first plate sheet in FIG. 23 or FIG. 24.

Referring to FIG. 25, the first plate 6c includes a first positioning portion 61c and a second positioning portion 62c, both of which penetrate the upper and lower surfaces of the first plate sheet 6c and are arranged along a width direction of the first plate sheet 6c. In a case that the first positioning portion 61c and the second positioning portion 62c are projected onto the second plate sheet 7c, a projection of the first positioning portion 61c is located inside the first groove 3c, and a projection of the second positioning portion 62c is located inside the second groove 4c, which is beneficial to improve the smoothness of fluid flow. In this embodiment, the mounting plate 5c only includes one first plate sheet 6c and one second plate sheet 7c. Of course, it may also include two or more first plate sheets 6c and two or more second plate sheets 7c. After that, the first groove 3c, the second groove 4c, the first positioning portion 61c and the second positioning portion 62c are formed by stacking.

Figure 24:
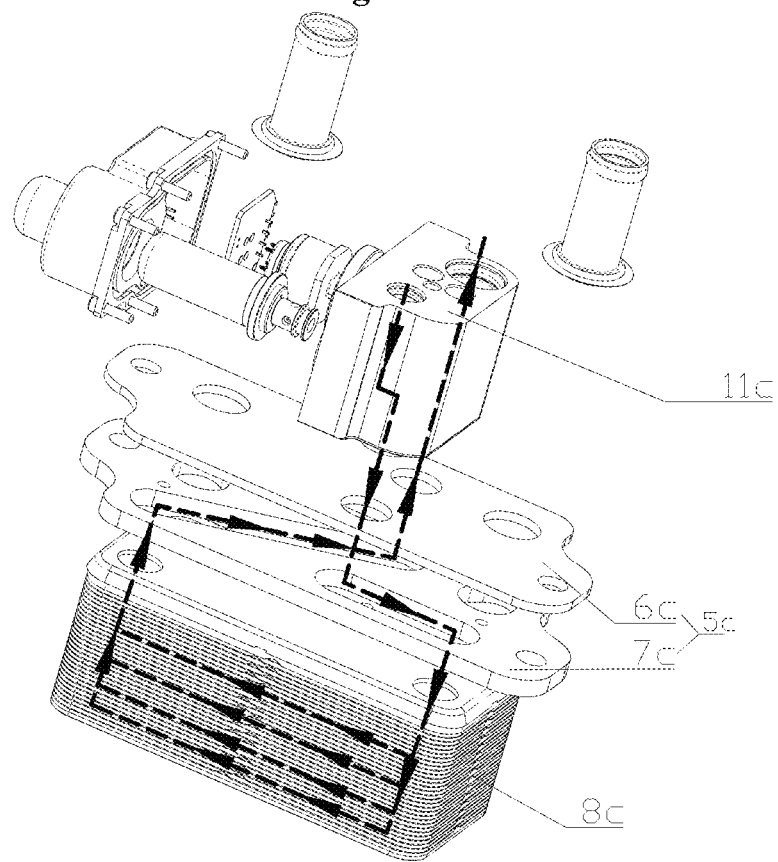
FIG. 24 is a schematic diagram of an explosive structure of the heat management assembly in FIG. 23, and a flow path of refrigerant is marked in the figure.

Compared with the first embodiment of the heat management assembly, in this embodiment, the heat management assembly 100c includes a mounting plate 5c. The valve body 11a and the heat exchange core body 2a are fixedly connected through the mounting plate 5c. The mounting plate 5c includes the first plate sheet 6c and the second plate sheet 7c, which re fixedly connected to each other. The first positioning portion 61c and the second positioning portion 62c are formed on the first plate sheet 6c. The first groove 3c and the second grooves 4c are formed on the second plate sheet 7c. In addition, in this embodiment, an installation orientation of the valve component 1c is also different. Specifically, a first flow channel 17c and a third flow channel 10c of the valve body are provided along a width direction of the heat exchange core body. Correspondingly, as shown in FIG. 24, the first groove 3c is provided on one side of the second plate sheet 7c and extends along a length direction of the second plate sheet 7c. The second groove 4c is provided obliquely, and one end of the second groove 4c is roughly located in an extension direction of the first groove 3c the first groove, the other end of the second groove 4c is inclined to the other side of the second plate sheet 7c, so as to establish a communication relationship with the third flow channel 10c in the installation orientation. For other features in this embodiment, reference can be made to the first embodiment, which will not be repeated here.

Figure 27:
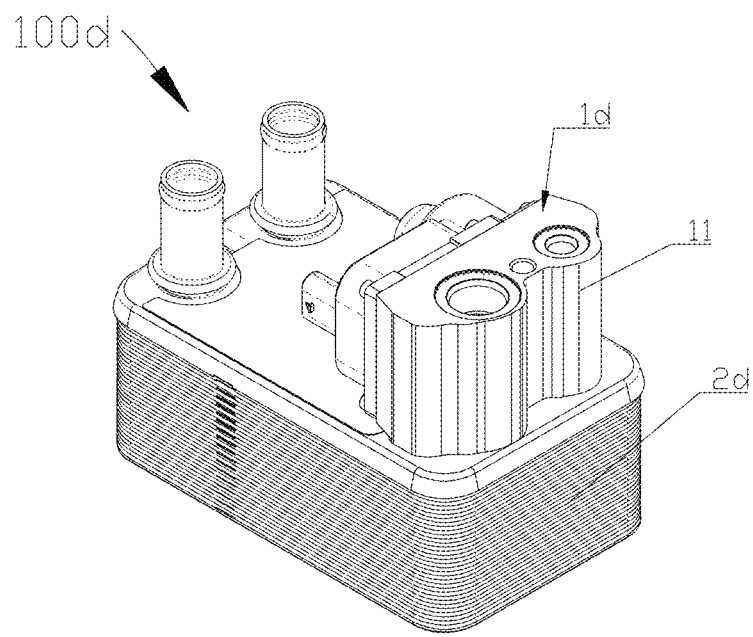
FIG. 27 is a schematic diagram of a three-dimensional structure of a fifth embodiment of a heat management assembly provided by the present application.
Figure 28:
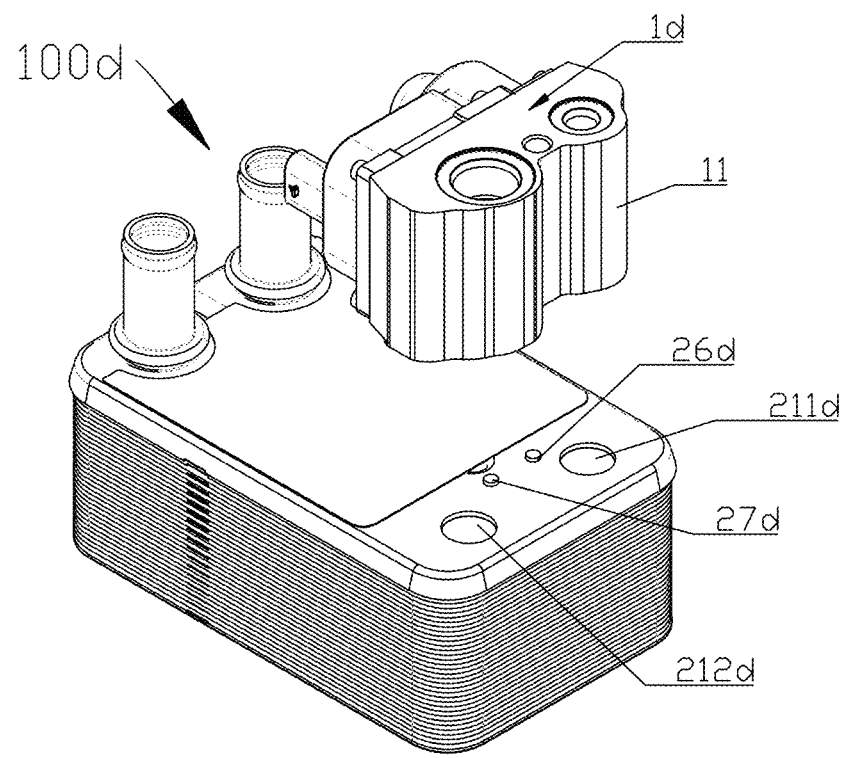
FIG. 28 is a schematic diagram of an explosive structure of the heat management assembly in FIG. 27.

Referring to FIGS. 27 to 28, FIGS. 27 to 28 are schematic diagrams of a structure of the fifth embodiment of the heat management assembly in the present application, and the structure of the fifth embodiment of the heat management assembly in the present application is described in detail below.

Referring to FIGS. 27 to 28, the heat management assembly 100d includes a heat exchange core body 2d and a valve component 1d. The heat exchange core body 2d includes two positioning portions, and one of the two positioning portions is defined as a first positioning portion 26d, and the other of the two positioning portions is defined as a second positioning portion 27d, both of which protrude from an upper surface of the heat exchange core body 2d and are both provided between the first drill way 211d and the second drill way 212d. The first positioning portion 26d and a first matching portion of the valve body 11d are provided in a clearance fit, and the second positioning portion 27d and a second matching portion of the valve body 11d are provided in a clearance fit, so that the valve body 11d and the heat exchange core body 2d may be positioned and installed. For the first matching portion of the valve body and the second matching portion of the valve body, reference may be made to the first embodiment of the heat management assembly in the present application, which will not be repeated here.

Compared with the first embodiment of the heat management assembly, in this embodiment, the valve component 1d is provided along a width direction of the heat exchange core body 2d. A driving side of the valve component 1d faces a reception pipe of the heat exchange core body 2d, which is a compact structure and occupies a small space. For other features in this embodiment, reference can be made to the first embodiment, which will not be repeated here.

Figure 29:
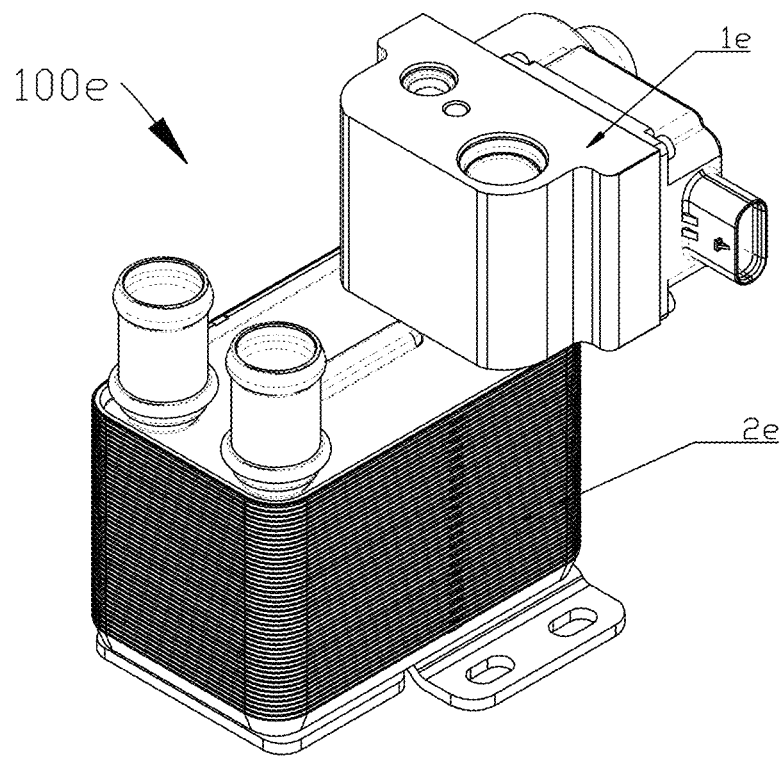
FIG. 29 is a schematic diagram of a three-dimensional structure of a sixth embodiment of a heat management assembly provided by the present application.
Figure 30:
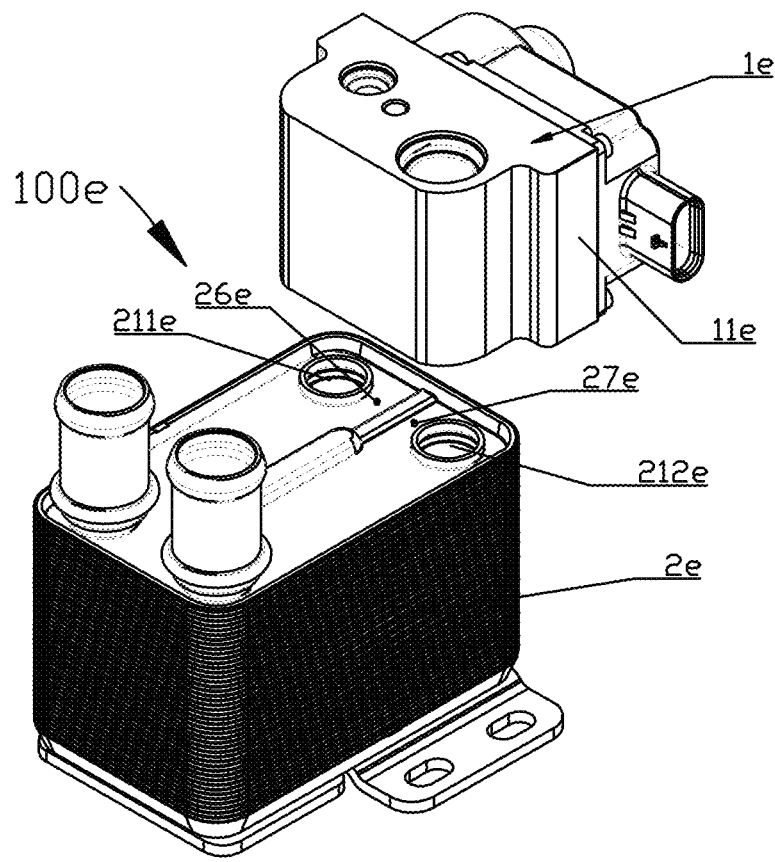
FIG. 30 is a schematic diagram of an explosive structure of the heat management assembly in FIG. 29.

Referring to FIGS. 29 to 30, FIGS. 29 to 30 are schematic diagrams of a structure of the sixth embodiment of the heat management assembly in the present application, and the structure of the sixth embodiment of the heat management assembly in the present application is described in detail below.

Referring to FIGS. 29 to 30, the heat management assembly 100e includes a heat exchange core body 2e and a valve component 1e. The heat exchange core body 2e includes two positioning portions, one of which is defined as a first positioning portion 26e, and the other is defined as a second positioning portion 27e, which both protrude from an upper surface of the heat exchange core body 2e and are both provided between the first drill way 211e and the second drill way 212e. The first positioning portion 26e and a first matching portion of the valve body 11e are provided in a clearance fit, and the second positioning portion 27e and a second matching portion of the valve body 11e are provided in a clearance fit, so that the valve body 11e and the heat exchange core body 2d may be positioned and installed. For the first matching portion of the valve body and the second matching portion of the valve body, reference may be made to the first embodiment of the heat management assembly in the present application, which will not be repeated here.

Compared with the first embodiment of the heat management assembly, in this embodiment, the valve component 1e is provided along a width direction of the heat exchange core body 2e. A driving side of the valve component 1e faces a reception pipe of the heat exchange core body 2e. For other features in this embodiment, reference may be made to the first embodiment, which will not be repeated here.

Figure 31:
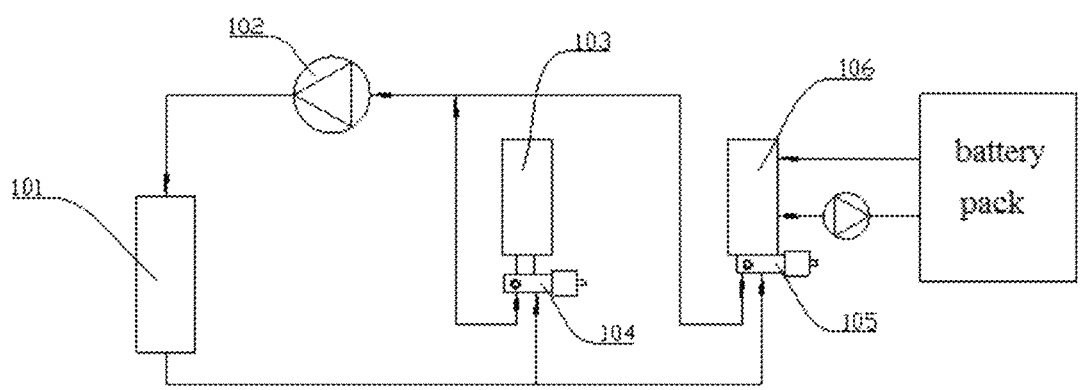
FIG. 31 is a schematic diagram of connections in an embodiment of a heat management system provided by the present application.

Referring to FIG. 31, a heat management system is further provided by the present application. The heat management system includes an air conditioning system and a battery cooling system, and the air conditioning system includes a compressor 102, a condenser 101, a first electronic expansion valve 104 and an evaporator 103. During the operation of the air conditioning system, a refrigerant is compressed into a refrigerant with high temperature and high pressure by the compressor 102, and it becomes a refrigerant with normal temperature and high pressure after passing through the condenser 101, and then enters the evaporator 103 through the first electronic expansion valve 104. Since a pressure of the refrigerant with normal temperature and high pressure decreases after passing through the first electronic expansion valve 104, the refrigerant is vaporized and becomes a low-temperature refrigerant, and it becomes a refrigerant after absorbing a large amount of heat through the evaporator 103 and flows back to the compressor 102. The battery cooling system includes a compressor 102, a condenser 101, a second electronic expansion valve 105, a heat exchanger 106, and a battery pack. During the operation of the battery cooling system, a refrigerant is compressed into a refrigerant with high temperature and high pressure by the compressor 102, and it becomes a refrigerant with normal temperature and high pressure after passing through the condenser 101. The refrigerant with normal temperature and high pressure passes through the second electronic expansion valve 105, and enters the heat exchanger 106 for exchanging heat in the heat exchanger 106. After passing through a heat exchange process performed by the heat exchanger 106, the refrigerant flows into the battery pack to cool the batteries in the battery pack. In this refrigeration system, the first electronic expansion valve 104 and the evaporator 103 may be installed separately in the system pipeline as two independent sections, or the first electronic expansion valve 104 and the evaporator 103 may be integrated and assembled together as a whole section to be installed in the system pipeline. Similarly, the second electronic expansion valve 105 and the heat exchanger 106 may be installed separately in the system pipeline as two independent sections, or the second electronic expansion valve 105 and the heat exchanger 106 may be integrated and assembled together as a whole section to be installed in the system pipeline. For ease of description, a component integrated and assembled together by the second electronic expansion valve 105 and the heat exchanger 106 are collectively referred to as a heat management assembly, and the heat management assembly is the heat management assembly described herein.

It should be noted that the above embodiments are merely used to illustrate the present application and not to limit the technical solutions described in the present application. Although the present application has been described herein in detail with reference to the above embodiments, those of ordinary skill in the art should understand that those skilled in the art may still combine, modify or equivalently replace the present application, and all technical solutions and its improvements that do not apart from the spirit and scope of the present application should be covered by the scope of the claims of the present application.

What is claimed is:

1. A heat management assembly, comprising a heat exchange core body and a valve component, wherein based on the heat exchange core body, the valve component is located above the heat exchange core body, and the heat exchange core body is fixedly connected to the valve component by welding; wherein the valve component comprises a valve body, a valve core, a valve port, and a circuit board, and the valve core is movable relative to the valve port for adjusting an opening degree of the valve port; wherein the valve body comprises a first flow channel and a second flow channel, which are communicated with each other and are respectively located on both sides of the valve port; wherein at least part of the first flow channel is located above the valve port, and at least part of the second flow channel is located below the valve port; wherein the valve body further comprises a third flow channel, which is not communicated with the first flow channel and the second flow channel on the valve body; wherein the valve component further comprises a sensor, which is fixedly connected to the valve body and is electrically connected to the circuit board; wherein at least part of the sensor extends into the third flow channel, and the sensor is configured to detect a temperature and/or pressure of a working medium in the third flow channel; wherein the heat exchange core body comprises at least one positioning portion, and the valve body comprises at least one matching portion, and the positioning portion and the matching portion are correspondingly provided for matching to define at least part of a relative position of the heat exchange core body and the valve body, wherein the heat exchange core body comprises two positioning portions, and one of the two positioning portions is defined as a first positioning portion, and the other of the two positioning portions is defined as a second positioning portion; wherein the valve body comprises two matching portions, one of the two matching portions is defined as a first matching portion, the other of two matching portions is defined as a second matching portion; wherein the first positioning portion and the first matching portion are in a clearance fit, the second positioning portion and the second matching portion are in a clearance fit; wherein a thickness of the first positioning portion is larger than a thickness of the first matching portion, and a thickness of the second positioning portion is larger than a thickness of the second matching portion, wherein the first positioning portion and the second positioning portion are formed on a main body section of the heat exchange core body, and the first positioning portion and the second positioning portion protrude from an upper surface of the main body section of the heat exchange core body; wherein the valve body comprises a first wall surface and a second wall surface, which are respectively located on both sides of the valve body; wherein an inlet hole of the first flow channel is formed on the first wall surface, and an outlet hole of the second flow channel is formed on the second wall surface; wherein the first matching portion and the second matching portion are both ring-shaped, and the first matching portion and the second matching portion extend along a direction from the second wall surface to the first wall surface.

2. The heat management assembly according to claim 1, wherein the heat exchange core body comprises a heat exchange main body and a mounting plate, the mounting plate is provided between the heat exchange main body and the valve component, and the heat exchange main body and the mounting plate are positioned and fixedly connected by welding; wherein the first positioning portion and the second positioning portion are formed on the mounting plate, which are both in a shape of hole and extend along a direction from a top surface to a bottom surface of the mounting plate; wherein the valve body comprises a first wall surface and a second wall surface, which are respectively located on both sides of the valve body; wherein an inlet hole of the first flow channel is formed on the first wall surface, and an outlet hole of the second flow channel is formed on the second wall surface; wherein the first matching portion and the second matching portion protrude from the second wall surface in a direction away from the second wall surface, the first matching portion is communicated with the second flow channel, and the second matching portion is communicated with the third flow channel, the first matching portion is arranged around an outlet hole of the second flow channel, and the second matching portion is arranged around an inlet hole of the third flow channel; wherein at least part of the first matching portion is inserted into the first positioning portion and is in a clearance fit with the first positioning portion, and at least part of the second matching portion is inserted into the second positioning portion and is in a clearance fit with the with the second positioning portion.

3. The heat management assembly of claim 2, wherein the mounting plate comprises a top surface and a bottom surface, which are respectively located on both sides of the mounting plate, the valve body and the top surface are fixedly connected by welding, and the heat exchange main body and the bottom surface are fixedly connected by welding; wherein the mounting plate comprises a first groove and a second groove, the first groove and the second groove are recessed along a direction from the bottom surface to the top surface, and the first groove and the second groove do not penetrate the top surface; wherein the first positioning portion is defined to be located above the first groove, the second positioning portion is defined to be located above the second groove, the first positioning portion is communicated with the first groove, and the second positioning portion is communicated with the second groove.

4. The heat management assembly according to claim 3, wherein the heat exchange core body comprises a first fluid channel and a second fluid channel, which are not communicated with each other; wherein the first fluid channel comprises a first drill way and a second drill way, which are communicated with each other; wherein the second flow channel and the first drill way are communicated through the first groove, and the third flow channel and the second drill way are communicated through the second groove; wherein in a case that the first positioning portion is projected onto the first groove, at least part of a projection of the first positioning portion is located inside the first groove; and in a case that the second positioning portion is projected onto the second groove, at least part of a projection of the second positioning portion is located inside the second groove.

5. The heat management assembly of claim 4, wherein the first groove comprises a first side surface and a second side surface, which are both planar; wherein one end of the first side surface and one end of the second side surface are connected by a first arc surface, a radius of the first arc surface is larger than a radius of an outlet hole of the second flow channel, and the other end of the first side surface and the other end of the second side surface are connected by a second arc surface, a radius of the second arc surface is larger a radius of an inlet hole of the first flow channel; wherein the first arc surface is closer to the outlet hole of the second flow channel than the second arc surface, and the first positioning portion is closer to the first arc surface than the second arc surface.

6. The heat management assembly of claim 5, wherein the second groove comprises a third side surface and a fourth side surface, which are both planar; wherein one end of the third side surface and one end of the fourth side surface are connected by a third arc surface, a radius of the third arc surface is larger than a radius of an inlet hole of the third flow channel, and the other end of the third side surface and the other end of the fourth side surface are connected by a fourth arc surface, a radius of the fourth arc surface is larger a radius of an outlet hole of the second flow channel; wherein the third arc surface is closer to the inlet hole of the third flow channel than the fourth arc surface, and the second positioning portion is closer to the fourth arc surface than the third arc surface.

7. The heat management assembly according to claim 2, wherein the mounting plate comprises a first plate sheet and a second plate sheet, and the first plate sheet and the second plate sheet are positioned and fixedly connected by welding; wherein the valve body and the first plate sheet are fixedly connected by welding, and the heat exchange main body and the second plate are fixedly connected by welding; wherein the first positioning portion and the second positioning portion are formed on the first plate sheet and penetrate an upper surface and a lower surface of the first plate sheet; wherein the second plate sheet comprises a first groove and a second groove, both of which penetrate an upper surface and a lower surface of the second plate sheet, the first positioning portion is communicated with the first groove, and the second positioning portion is communicated with the second groove.

8. The heat management assembly according to claim 7, wherein the heat exchange core body comprises a first fluid channel and a second fluid channel, which are not communicated with each other; wherein the first fluid channel comprises a first drill way and a second drill way, which are communicated with each other; wherein the second flow channel and the first drill way are communicated through the first groove, and the third flow channel and the second drill way are communicated through the second groove; wherein in a case that the first positioning portion is projected onto the first groove, at least part of a projection of the first positioning portion is located inside the first groove; and in a case that the second positioning portion is projected onto the second groove, at least part of a projection of the second positioning portion is located inside the second groove.

9. The heat management assembly according to claim 1, wherein the heat exchange core body comprises a first fluid channel and a second fluid channel, and the first fluid channel and the second fluid channel are not communicated with each other; wherein the first fluid channel comprises a first drill way and a second drill way, which are communicated with each other; wherein the first positioning portion and the second positioning portion are provided between the first drill way and the second drill way; wherein the valve body comprises a first groove and a second groove, which are recessed along a direction from the second wall to the first wall and do not penetrate the first wall surface; wherein the first groove is communicated with the second flow channel, and the second groove is communicated with the third flow channel; wherein the first matching portion and the second matching portion are located between the first groove and the second groove, the second flow channel and the first drill way first groove are communicated with each other through the first groove, and the third flow channel and the second drill way are communicated with each other through the second groove.

10. A heat management system, comprising a compressor, a condenser, and the heat management assembly according to claim 1; wherein an outlet of the compressor is communicated with an inlet of the condenser, an outlet of the condenser is communicated with an inlet of the first flow channel of the heat management assembly, and an inlet of the compressor is communicated with an outlet of the third flow channel of the heat management assembly.

* * * * *